US012732989B2

(12) United States Patent
Zhao et al.

(10) Patent No.: US 12,732,989 B2
(45) Date of Patent: Sep. 8, 2026

(54) METHOD AND APPARATUS FOR COOPERATIVE SCHEDULING IN A MOBILE COMMUNICATION SYSTEM

(71) Applicant: Samsung Electronics Co., Ltd., Suwon-si (KR)

(72) Inventors: Yi Zhao, Beijing (CN); Yupu Liu, Beijing (CN); Xiaohui Liang, Beijing (CN); Zhe Zheng, Beijing (CN); Guangcan Yan, Beijing (CN); Huiyang Wang, Beijing (CN); Jiajia Wang, Beijing (CN); Meifang Jing, Beijing (CN); Xiaohui Yang, Beijing (CN); Hongliang Bian, Beijing (CN); Yan Li, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 425 days.

(21) Appl. No.: 18/309,200

(22) Filed: Apr. 28, 2023

(65) Prior Publication Data

US 2023/0276431 A1 Aug. 31, 2023

Related U.S. Application Data

(63) Continuation of application No. PCT/KR2021/017894, filed on Nov. 30, 2021.

(30) Foreign Application Priority Data

Nov. 30, 2020 (CN) ......................... 202011380935.9

(51) Int. Cl.
*H04W 72/1263* (2023.01)
*H04W 16/28* (2009.01)

(52) U.S. Cl.
CPC ....... *H04W 72/1263* (2013.01); *H04W 16/28* (2013.01)

(58) Field of Classification Search
CPC .......................... H04W 72/1263; H04W 16/28
(Continued)

(56) References Cited

U.S. PATENT DOCUMENTS 8,873,477 B2 10/2014 Xiao
9,078,141 B2 7/2015 Hwang
(Continued)

FOREIGN PATENT DOCUMENTS

CN 102917375 A * 2/2013 ........ H04W 36/0072
CN 109392021 A 2/2019
(Continued)

OTHER PUBLICATIONS

OPPO; Enhancements on beam management for multi-TRP; 3GPP TSG RAN WG1 #103-e; R1-2008220; Oct. 26, 2020-Nov. 13, 2020; e-Meeting.

(Continued)

*Primary Examiner* — Huy D Vu
(74) *Attorney, Agent, or Firm* — Jefferson IP Law, LLP

(57) ABSTRACT

The disclosure relates to a communication method and system for converging a $5^{th}$-Generation (5G) communication system for supporting higher data rates beyond a $4^{th}$-Generation (4G) system with a technology for Internet of Things (IoT). The disclosure applies to intelligent services based on the 5G communication technology and the IoT-related technology, such as smart home, smart building, smart city, smart car, connected car, health care, digital education, smart retail, security and safety services. A method performed by a network-side control node in mobile communication system is provided. The method includes acquiring information related to cooperative scheduling cor- (Continued)

responding to a base station, determining configuration information for cooperative scheduling on traffics in overlapped beam coverage areas associated with a plurality of base stations including the base station, based on the information related to cooperative scheduling, and transmitting, to the base station, the configuration information.

20 Claims, 28 Drawing Sheets

(58) Field of Classification Search
USPC .......................................................... 370/329
See application file for complete search history.

(56) References Cited

U.S. PATENT DOCUMENTS

2008/0267063 A1* 10/2008 Trigui et al. ............. H04B 7/12 370/229
2014/0073337 A1 3/2014 Hong et al.
2015/0071186 A1* 3/2015 Chen et al. ........... H04W 24/02 370/329
2017/0055273 A1 2/2017 Sharma et al.
2022/0182847 A1 6/2022 Sha et al.

FOREIGN PATENT DOCUMENTS

KR 10-2014-0035255 A 3/2014
KR 10-1884332 B1 8/2018
WO 2017/095467 A1 6/2017

OTHER PUBLICATIONS

Xiaomi; Enhancement on Inter-cell Multi-TRP operations; 3GPP TSG RAN WG1 #103-e; R1-2009029; Oct. 26, 2020-Nov. 13, 2020; e-Meeting.
International Search Report with Written Opinion dated Mar. 10, 2022; International Appln. No. PCT/KR2021/017894.
Chinese Office Action dated May 23, 2026, issued in Chinese Patent Application No. 2020113809359.

* cited by examiner

| PRB_L | Beam index | Predicted PRB utilization (%) | Total PRB utilization (%) | PRB utilization level (%) |
|---|---|---|---|---|
| P original beam areas | 1 | $y_1$ | $Y_0 = \sum_{p=1}^{P} y_p$ | High > Th5<br>Low <= Th5 |
| | ... | ... | | |
| | P | $y_P$ | | |
| Q cooperative beam areas | P + 1 | $y_{P+1}$ | $Y_c = \sum_{p=P+1}^{P+Q} y_p$ | N/A |
| | ... | ... | | |
| | P + Q | $y_{P+Q}$ | | |

FIG. 12

| Traffic_L | Beam index | Predicted traffic delay | Average flow delay | T traffic delay level |
|---|---|---|---|---|
| P original beam areas | 1 | $z_1$ | $Z_0 = \frac{1}{P}\sum_{p=1}^{P} z_p$ | Long > Th6<br>Short <= Th6 |
| | ... | ... | | |
| | P | $z_P$ | | |
| Q cooperative beam areas | P + 1 | $z_{P+1}$ | $Z_c = \frac{1}{Q}\sum_{p=P+1}^{P+Q} z_p$ | N/A |
| | ... | ... | | |
| | P + Q | $z_{P+Q}$ | | |

FIG. 13

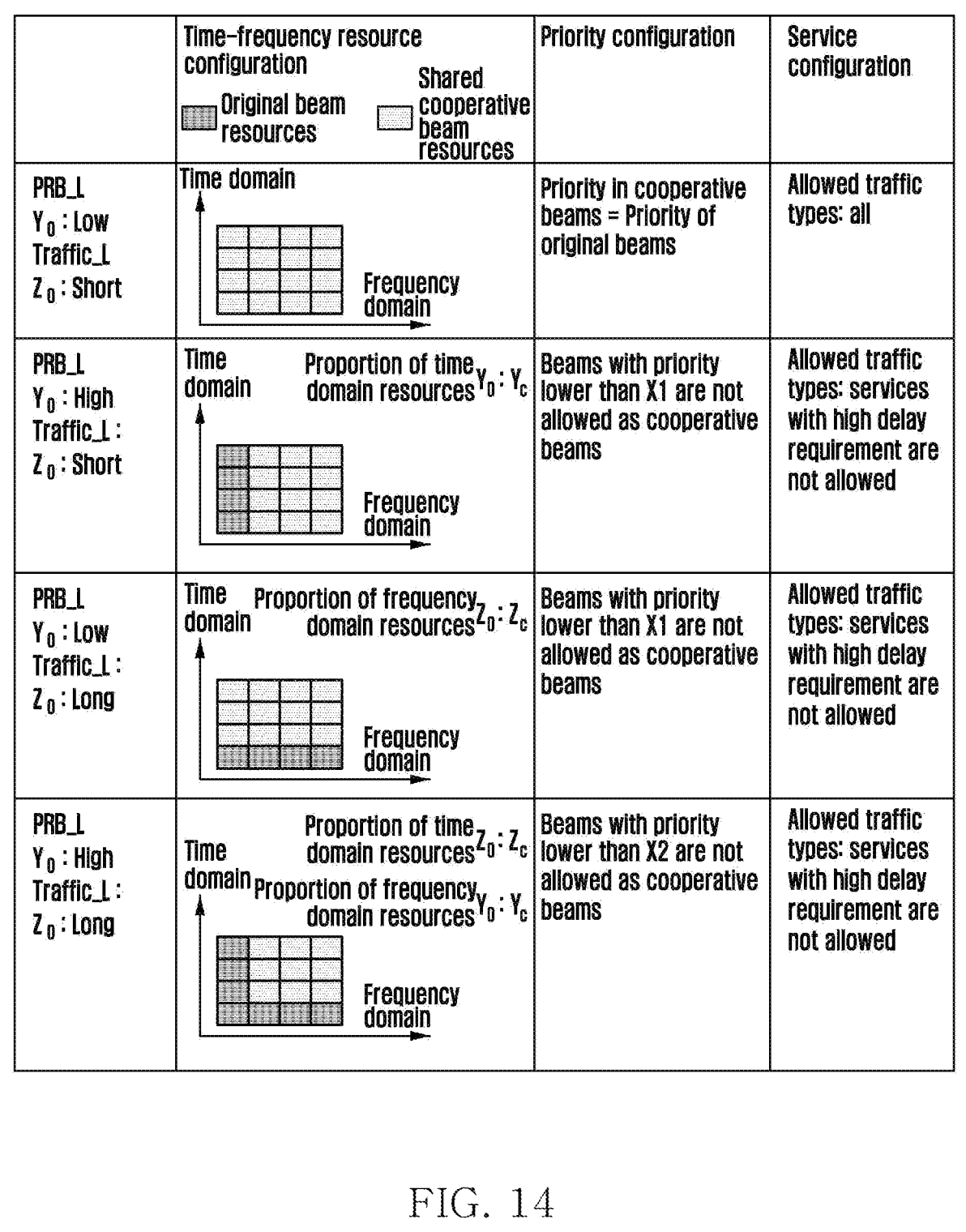

| | Time-frequency resource configuration (Original beam resources; Shared cooperative beam resources) | Priority configuration | Service configuration |
|---|---|---|---|
| PRB_L<br>$Y_0$ : Low<br>Traffic_L<br>$Z_0$ : Short | Time domain<br>Frequency domain | Priority in cooperative beams = Priority of original beams | Allowed traffic types: all |
| PRB_L<br>$Y_0$ : High<br>Traffic_L :<br>$Z_0$ : Short | Time domain<br>Proportion of time domain resources $Y_0 : Y_c$<br>Frequency domain | Beams with priority lower than X1 are not allowed as cooperative beams | Allowed traffic types: services with high delay requirement are not allowed |
| PRB_L<br>$Y_0$ : Low<br>Traffic_L :<br>$Z_0$ : Long | Time domain<br>Proportion of frequency domain resources $Z_0 : Z_c$<br>Frequency domain | Beams with priority lower than X1 are not allowed as cooperative beams | Allowed traffic types: services with high delay requirement are not allowed |
| PRB_L<br>$Y_0$ : High<br>Traffic_L :<br>$Z_0$ : Long | Time domain<br>Proportion of time domain resources $Z_0 : Z_c$<br>Proportion of frequency domain resources $Y_0 : Y_c$<br>Frequency domain | Beams with priority lower than X2 are not allowed as cooperative beams | Allowed traffic types: services with high delay requirement are not allowed |

FIG. 14

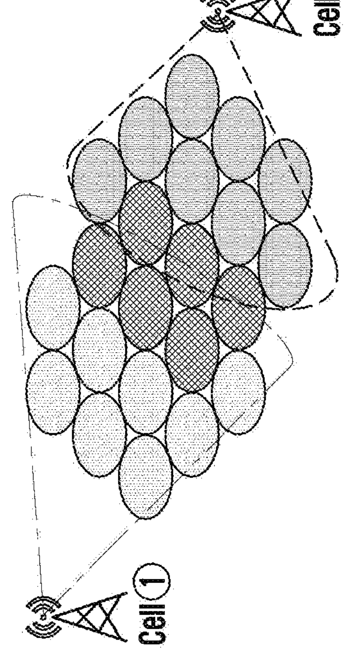
Scenario 2: In daytime, Cell① in residential area is in idle status, but Cell② in the business area is in busy status; at night, vice versa
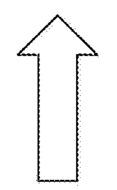
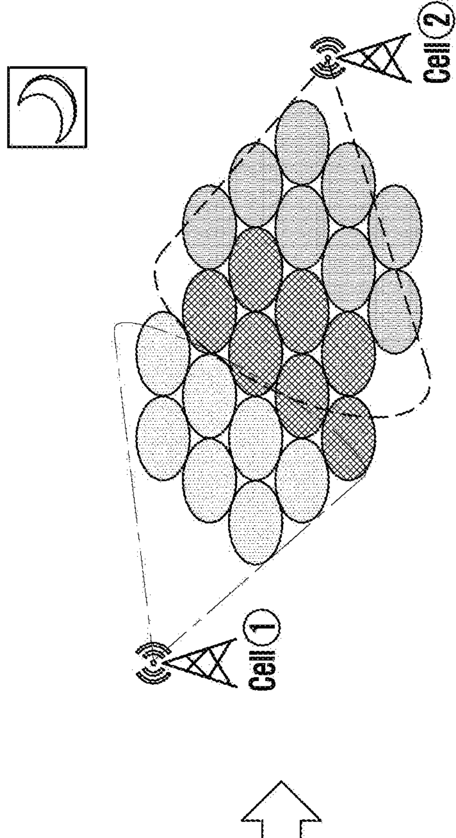
Coordinate the beam area range according to traffic status in the day and night, and flexibly share traffic load for residential and business areas
FIG. 22

METHOD AND APPARATUS FOR COOPERATIVE SCHEDULING IN A MOBILE COMMUNICATION SYSTEM

CROSS-REFERENCE TO RELATED APPLICATION(S)

This application is a continuation application, claiming priority under § 365(c), of an International application No. PCT/KR2021/017894, filed on Nov. 30, 2021, which is based on and claims the benefit of a Chinese patent application number 202011380935.9, filed on Nov. 30, 2020, in the Chinese Intellectual Property Office, the disclosure of each of which is incorporated by reference herein in its entirety.

BACKGROUND

1. Field

The disclosure relates to the field of communication technologies. More particularly, the disclosure relates to a cooperative scheduling method and related device.

2. Description of Related Art

To meet the demand for wireless data traffic having increased since deployment of fourth-generation (4G) communication systems, efforts have been made to develop an improved fifth-generation (5G) or pre-5G communication system. Therefore, the 5G or pre-5G communication system is also called a 'Beyond 4G Network' or a 'Post long-term evolution (LTE) System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid frequency shift-keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

In a mobile communication system, a coverage area of a cell under each base station is determined by coverage areas of respective beams in a corresponding cell. Due to limitation from the site selection conditions of a base station, there are overlapped beam coverage areas between cells.

However, in existing implementation schemes, in order to avoid the reduction of data transmission rate caused by signal interference between cells, a geographical area is allowed to be covered by only one beam of a particular cell under one base station even if it is covered by beams in multiple cells. Therefore, there is a problem that cells with overlapped beam coverage areas cannot cooperate with each other, resulting in that date transmission requirements of users in overlapped beam coverage areas cannot be reliably guaranteed, as well as a decrease in system throughput and an increase in scheduling delay.

Aspects of the disclosure are to address at least the above-mentioned problems and/or disadvantages and to provide at least the advantages described below. Accordingly, an aspect of the disclosure is to provide a method and apparatus for cooperative scheduling in a mobile communication system.

Additional aspects will be set forth in part in the description which follows and, in part, will be apparent from the description, or may be learned by practice of the presented embodiments.

In accordance with an aspect of the disclosure, a method performed by a network-side control node in mobile communication system is provided. The method includes acquiring information related to cooperative scheduling corresponding to a base station, determining configuration information for cooperative scheduling on traffics in overlapped beam coverage areas associated with a plurality of base stations including the base station, based on the information related to cooperative scheduling, and transmitting, to the base station, the configuration information.

In accordance with another aspect of the disclosure, a network-side control node in mobile communication system is provided. The network-side control node includes a transceiver and at least one processor. The at least one processor is configured to acquire information related to cooperative scheduling corresponding to a base station, determine configuration information for cooperative scheduling on traffics in overlapped beam coverage areas associated with a plurality of base stations including the base station, based on the information related to cooperative scheduling, and transmit, to the base station via the transceiver, the configuration information.

The disclosure provides a cooperative scheduling method and related device, of which technical solutions are as follows:

In accordance with another aspect of the disclosure, a cooperative scheduling method is provided. The method includes:

- acquiring information related to cooperative scheduling corresponding to a base station;
- determining configuration information for cooperative scheduling on traffics in overlapped beam coverage areas, based on the information related to cooperative scheduling; and
- configuring the base station based on the configuration information, accordingly.

Optionally, the information related to cooperative scheduling includes at least one of base station status information and UE status information of a UE serviced by the base station;

- wherein, the base station status information includes at least one of base station location information, base station antenna configuration information, beam weight information corresponding to a cell under the base station, information about the number of UEs corresponding to beams in the cell, beam traffic information, information on mapping relationship of beams and the cell, information on the number of UEs corresponding to the cell, cell traffic information, information on neighbor relationship corresponding to the cell, traffic delay information corresponding to the cell, resource utilization information corresponding to the cell, and scheduling capability information; and
- wherein, the UE status information includes at least one of UE channel status information, UE data transmission requirement information, and UE measurement information.

Optionally, the operation of determining configuration information for cooperative scheduling on traffics in overlapped beam coverage areas, based on the information related to cooperative scheduling includes:

- determining the beam coverage area to be serviced by the cell under the base station based on the information related to cooperative scheduling; and
- determining the configuration information of the cell based on the beam coverage area to be serviced by the cell.

Optionally, the operation of determining the beam coverage area to be serviced by the cell under the base station based on the information related to cooperative scheduling includes:

- determining scheduling status information of the cell under the base station based on the information related to cooperative scheduling;
- determining cell type based on the scheduling status information, wherein the type includes one of a first type which needs cooperation, a second type with cooperative scheduling capability, and a third type which does not need cooperation or has no cooperative capability; and
- determining the beam coverage area to be serviced by the cell based on the cell type.

Optionally, the scheduling status information of the cell includes predicted resource utilization and/or the number of active beams.

Optionally, the information related to cooperative scheduling includes predicted resource utilization and/or number of active beams; or the operation of determining scheduling status information of the cell under the base station based on the information related to cooperative scheduling includes:

predicting the resource utilization and/or the number of active beams of the cell based on the information related to cooperative scheduling.

Optionally, the operation of determining cell type based on the scheduling status information includes at least one of the following:

- determining the cell type as the first type, when the predicted number of active beams is greater than a first preset threshold, or the predicted resource utilization is greater than a second preset threshold;
- determining the cell type as the second type, when the predicted number of active beams is less than a third preset threshold, and the predicted resource utilization is less than a fourth preset threshold; and
- determining the cell type as the third type for a cell that cannot be determined as the first type or the second type,
- wherein, the first preset threshold is not less than the third preset threshold, and the second preset threshold is not less than the fourth preset threshold.

Optionally, the operation of determining the beam coverage area to be serviced by the cell based on the cell type includes:

- determining a cell providing service to the overlapped beam coverage area, based on the cell type; and
- determining a beam coverage area serviced by each cell, based on the cell providing service to the overlapped beam coverage area.

Optionally, the operation of determining a cell providing service to the overlapped beam coverage area based on the cell type includes:

- determining a beam coverage area which needs cooperative scheduling, based on a beam coverage area overlapped by a cell belonging to the first type and another cell;
- determining a candidate serving cell corresponding to the beam coverage area which needs cooperative scheduling, based on the beam coverage area which needs cooperative scheduling and types of respective cells; and
- determining a cell providing service to the beam coverage area which needs cooperative scheduling, based on the candidate serving cell.

Optionally, the operation of determining a cell providing service to the beam coverage area which needs cooperative scheduling based on the candidate serving cell includes:

- performing the following steps until allocation of all beam coverage areas which need cooperative scheduling is completed:
- selecting a corresponding beam coverage area with the largest predicted resource utilization among beam coverage areas which need cooperative scheduling;
- and selecting a corresponding candidate serving cell with the lowest resource utilization among candidate serving cells corresponding to the selected beam coverage area, as a cell providing service to the selected beam coverage area.

Optionally, before the operation of determining scheduling status information of the cell under the base station based on the information related to cooperative scheduling, the method further includes:

dividing respective cells into different cooperative scheduling groups; and wherein, the operation of determining scheduling status information of the cell under the base station based on the information related to cooperative scheduling includes:

determining scheduling status information of respective cells in a cooperative scheduling group, for each cooperative scheduling group, based on the information related to cooperative scheduling.

Optionally, the operation of dividing respective cells into different cooperative scheduling groups includes:

determining a cooperative weight between cells based on predicted traffic volume in the beam coverage area overlapped between the cells; and dividing respective cells into different cooperative scheduling groups, based on the cooperative weight between cells.

Optionally, the operation of dividing respective cells into different cooperative scheduling groups, based on the cooperative weight between cells includes at least one of the following:

dividing cells with the high cooperative weight into a same cooperative scheduling group; and repeating the following operations, until the number of cells in the cooperative scheduling group reaches to a first set value: including cells having the highest cooperative weight with existing cells in current cooperative scheduling group;

acquiring a cell relationship graph, wherein the cell relationship graph uses points to characterize cells, and edges to characterize cooperative weights between cells; judging, every after performing the following operation on cutting, whether an independent relationship graph in which the number of cells is less than a second set value is formed, if yes, dividing corresponding cells into a same cooperative scheduling group, and if not, performing the following operation on cutting continually until all cells are divided into corresponding cooperative scheduling groups: cutting an edge with the lowest cooperative weight between cells, from the cell relationship graph.

Optionally, the operation of determining the configuration information of the cell based on the beam coverage area to be serviced by the cell includes:

for a cell of which the overlapped beam coverage area is required to be cooperatively scheduled by another cell, determining the information of the beam coverage area to be serviced by the cell as the configuration information of the cell; and for a cell that is required to perform cooperative scheduling on the overlapped beam coverage, determining the configuration information of the cell based on predicted resource utilization and/or predicted traffic delay corresponding to the beam coverage area to be serviced by the cell.

Optionally, the beam coverage area to be serviced by the cell includes an originally scheduled beam coverage area and a beam coverage area requiring cooperative scheduling; and wherein the operation of determining the configuration information on the cell in performing cooperative scheduling based on predicted resource utilization and/or predicted traffic delay corresponding to beam coverage area to be serviced by the cell comprises at least one of the following:

determining time-frequency resource of the cell based on predicted resource utilization corresponding to the originally scheduled beam coverage area and the beam coverage area requiring cooperative scheduling respectively;

determining time-frequency resource of the cell based on predicted traffic delays corresponding to the originally scheduled beam coverage area and the beam coverage area requiring cooperative scheduling respectively; and determining traffic requiring to be cooperatively scheduled by the cell, based on priorities and/or traffic delays of traffics in the beam coverage area requiring cooperative scheduling.

Optionally, after the operation of performing configuration on the base station based on the configuration information, the method further includes:

acquiring resource utilization and/or traffic delays corresponding to cells in the cooperative scheduling group; and updating the configuration information based on the resource utilization and/or the traffic delays corresponding to cells in the cooperative scheduling group.

Optionally, the operation of performing configuration on the base station based on the configuration information includes:

transmitting the configuration information to the base station, so that the base station performs cooperative scheduling based on the configuration information.

In accordance with another aspect of the disclosure, a cooperative scheduling method is provided. The method includes:

reporting information related to cooperative scheduling;

receiving configuration information for cooperative scheduling on traffics in overlapped beam coverage areas determined based on the information related to cooperative scheduling; and performing cooperative scheduling based on the configuration information.

Optionally, the operation of performing cooperative scheduling based on the configuration information includes:

determining a scheduling type of a cell based on the configuration information;

for a determined first type cell of which the overlapped beam coverage area is required to be cooperatively scheduled by other cells, handovering the UE(s), requiring to be cooperatively scheduled by the other cells, under the first type cell into a cell performing cooperative scheduling; and for a determined second type cell that is required to perform cooperative scheduling on the overlapped beam coverage, configuring the second type cell to perform cooperative scheduling, based on the time domain resource and/or frequency domain resource and/or traffic information to be executed in the configuration information.

In accordance with another aspect of the disclosure, a cooperative scheduling apparatus is provided, the apparatus including:

an acquiring module configured to acquire information related to cooperative scheduling corresponding to a base station;

a determining module configured to determine configuration information for cooperative scheduling on traffics in overlapped beam coverage areas, based on the information related to cooperative scheduling; and a configuring module configured to configure the base station based on the configuration information.

In accordance with another aspect of the disclosure, a cooperative scheduling apparatus is provided. The apparatus includes:

a reporting module configured to report information related to cooperative scheduling;

a receiving module configured to receive configuration information for cooperative scheduling on traffics in overlapped beam coverage areas determined based on the information related to cooperative scheduling; and an execution module configured to perform cooperative scheduling based on the configuration information.

In accordance with another aspect of the disclosure, an electronic device is provided. The electronic device includes:

one or more processors;

a memory;

one or more application programs, wherein the one or more application programs are stored in the memory and configured to implement, when executed by the one or more processors, the cooperative scheduling method according to the first or second aspect.

In accordance with another aspect of the disclosure, a computer-readable storage medium is provided. The storage medium stores at least one instruction, at least one program, a code set, or an instruction set, wherein the at least one instruction, the at least one program, the code set or the instruction set is loaded and executed by a processor to implement the cooperative scheduling method according to the first or second aspect.

In accordance with another aspect of the disclosure, a cooperative scheduling method and related device are provided. The method and related device are applied to a control node in network side and may be further applied to an access network (including base stations and other access network device) or core networks node; compared with the prior art, the disclosure may determine configuration information for cooperative scheduling on traffics in overlapped beam coverage areas, according to acquiring information related to cooperative scheduling in a base station, thereby configuring the base station based on the configuration information. The implement of the disclosure enables a mobile communication system to perform cooperative scheduling on traffics in an overlapped beam coverage area, and achieve an effect of improving system throughput and reducing data transmission delay by fully using of scheduling capability of base stations in a network.

In accordance with another aspect of the disclosure, a cooperative scheduling method and related device are provided. The method and related device are applied to a base station, compared with the prior art, the base station in the disclosure performs cooperative scheduling based on received configuration information for cooperative scheduling on traffics in overlapped beam coverage areas, which the configuration information is determined based on information related to cooperative scheduling in the base station. The implementation of the disclosure achieves an effect of improving system throughput and reducing data transmission delay by fully using of scheduling capability of base stations in a network.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 12 shows information on resource utilization corresponding to an original beam coverage area and a cooperative beam coverage area in cells under a base station according to an embodiment of the disclosure;

FIG. 13 shows information on traffic delay corresponding to an original beam coverage area and a cooperative beam coverage area in cells under a base station according to an embodiment of the disclosure;

FIG. 14 shows time-frequency resources, priorities and traffic configuration information corresponding to different levels according to an embodiment of the disclosure;

FIG. 22 is a schematic diagram of effect of the cooperative scheduling method according to an embodiment of the disclosure;

The same reference numerals are used to represent the same elements throughout the drawings.

DETAILED DESCRIPTION

Figure 1:
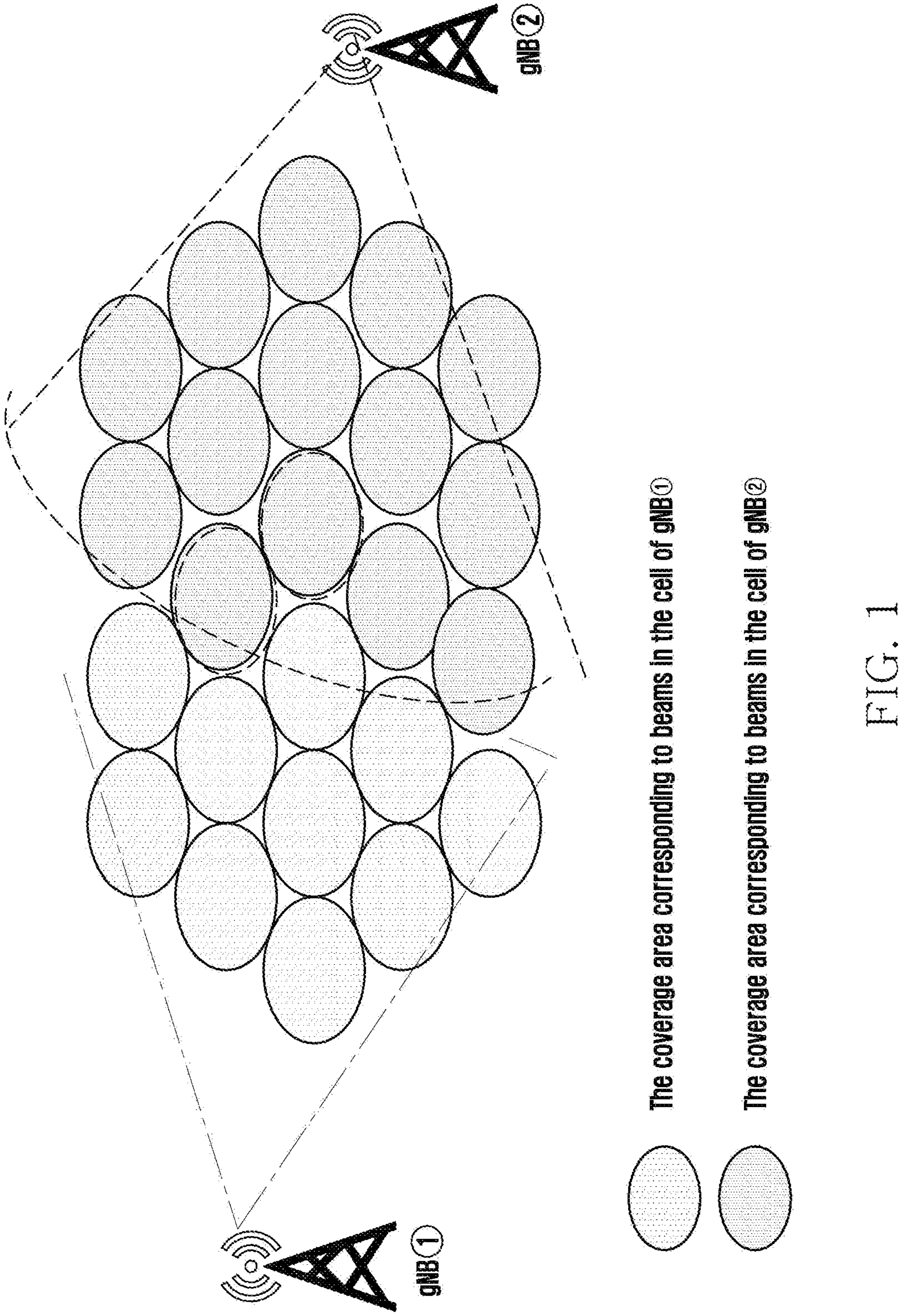
FIG. 1 is a schematic diagram of beam scheduling according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

Those skilled in the art will understand that the singular forms “a”, “an”, “said” and “the” as used herein may also include plural forms unless expressly stated. It should be further understood that the term “including” as used in the specification of this application refers to the presence of stated features, integers, steps, operations, elements and/or components, but does not preclude the presence or addition of one or more other features, integers, steps, operations, elements, components and/or groups thereof. It should be understood when we call an element “connected” or “coupled” to another element, it may be directly connected or coupled to the other element, or intervening elements may also be present. In addition, as used herein, “connected” or “coupled” may include a wireless connection or wireless coupling. As used herein, the phrase “and/or” includes all or any element and all combinations of one or more associated listed items.

In order to make the purpose, technical solution and advantages of this application clearer, the following will further describe embodiments of the disclosure in detail with reference to the accompanying drawings.

In the fifth generation (5G) mobile communication system, due to use of higher frequency band (for example, the millimeter wave frequency band), a corresponding coverage area is smaller. In order to enhance 5G coverage, beamforming has emerged. Beamforming technology, by adjusting amplitudes and phases of multiple antennas, gives an antenna radiation pattern a specific shape and direction, so that wireless signal energy is concentrated on a narrower beam to enhance coverage and reduce interference. Since a terminal is often in a mobile state, high-frequency signals (especially millimeter waves) are easily affected by surrounding environment, such as being blocked by buildings, rain, etc., it may easily cause beam signals to fail to reach the terminal. Therefore, in the prior art, in order to ensure continuous seamless coverage, each cell at a base station side transmits multiple beams in different directions, so as to provide data transmission services for terminals in different locations.

For 5G (for example: 5G above 6G, 5G A6G) systems that use frequency domain resources higher than 6 GHz, a coverage area of a cell under each base station is determined by a coverage area of each beam in the corresponding cell (hereinafter referred to as beam coverage area), wherein a cell may contain 16 beams, 32 beams, 64 beams or even more beams. In a 5G system, data transmission in multiple beams in a cell can be scheduled by a base station at the same time. However, considering the cost of the base station, the number of beams that can be scheduled at the same time in the cell under the base station is limited. Generally, 2, 4, 6, and 8 beams can be scheduled at the same time for data transmission.

Ideally, the overlap of the coverage areas of the cells under respective base stations should be relatively small. However, due to the limitation of the base station location conditions, in actual deployment, the overlap of the coverage areas of the cells under respective base stations will be large. In order to avoid the reduction of data transmission rate caused by signal interference between cells, in the prior art, even if a geographic area may be covered by beams in multiple cells under base station(s), it is only allowed to be covered by one beam in a cell under one base station. The relationship between the geographic area and the corresponding beam is determined during coverage planning.

FIG. 1 is a schematic diagram of beam scheduling according to an embodiment of the disclosure.

Referring to FIG. 1, there is an overlapped beam coverage area between a cell under the base station gNB (next-generation NodeB)① and a cell under the base station gNB②, and the beam coverage area in the overlapped location can only be scheduled by a cell under gNB① or gNB②, which gNB① or gNB② cannot cooperate with each other. It should be noted that one base station in the actual system may contain one or more cells. For ease of description, gNB① and gNB② are described by using a single cell as an example.

Since beam coverage areas in a cell under each base station is unchanged in the prior art, a overlapped area between base stations can only be scheduled by a cell corresponding to a fixed base station, there is a problem that cells under base station(s) in overlapped beam coverage area is unable to cooperate (e.g., different cells in a same base station is unable to cooperative schedule, or different cells in different base stations is unable to cooperate with each other), thereby resulting in a problem that data transmission requirements of users in an overlapped beam coverage area cannot be reliably guaranteed, as well as reducing system throughput and increasing scheduling delay.

Figure 2:
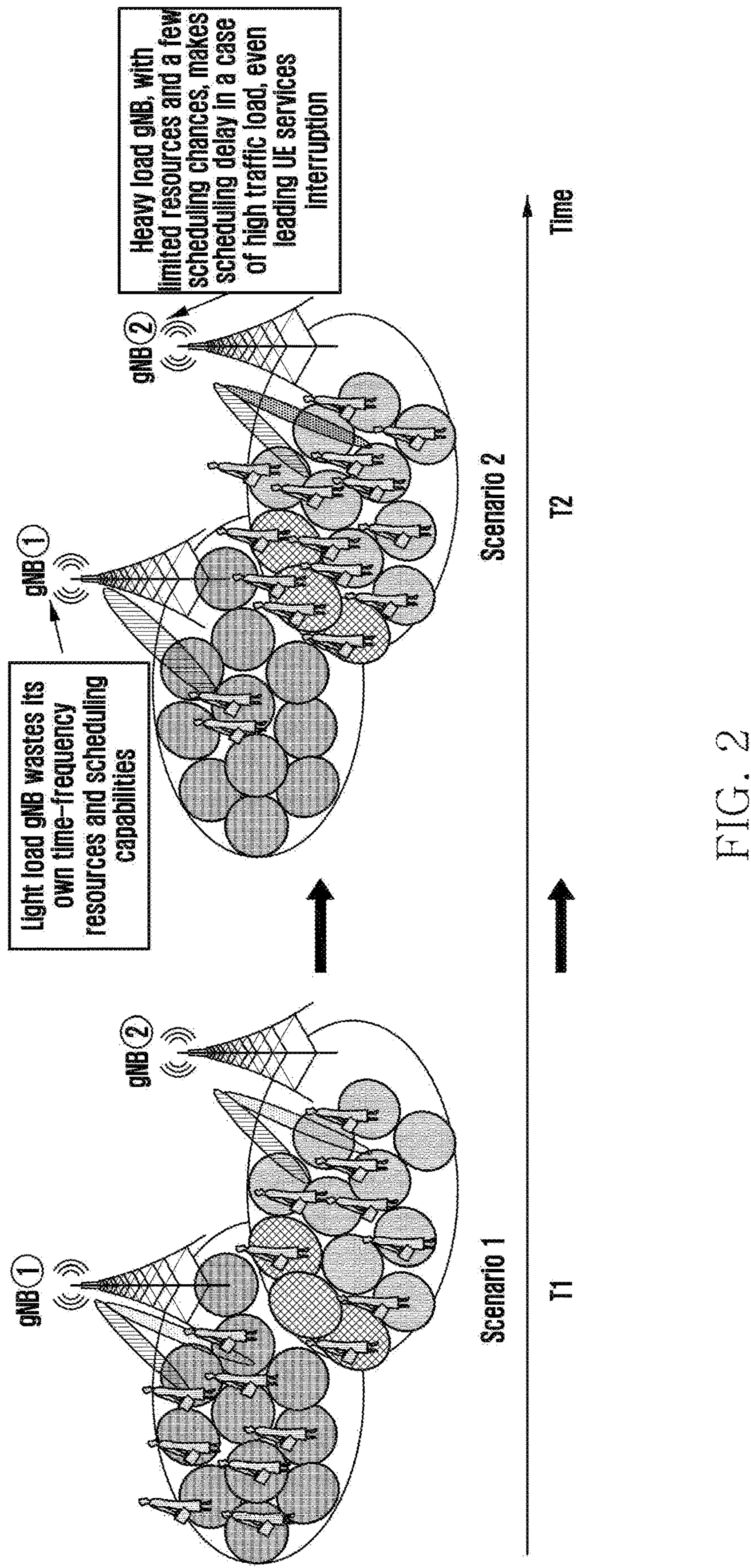
FIG. 2 is a schematic diagram of beam scheduling according to an embodiment of the disclosure.

FIG. 2 is a schematic diagram of beam scheduling according to an embodiment of the disclosure.

Based on the foregoing prior art, the description will be made in conjunction with the scenario shown in FIG. 2.

Referring to FIG. 2, there is a overlapped beam coverage area between a cell under the gNB① and a cell under the gNB②, which respective loads of gNB① and gNB② in scenario 1 are substantially equivalent; when transitioning from scenario 1 shown as T1 to scenario 2 shown as T2, traffic requirements corresponding a cell under gNB② are far greater than traffic requirements corresponding a cell under gNB①; in scenario 2, a cell under gNB② belongs to a heavy-load cell, while a cell under gNB① belongs to a light-load cell; an overlapped beam coverage area between these two can only be scheduled by the cell under gNB②.

From the network side (also appreciated as server side) perspective, in a place that overlaps with beam coverage areas between cells under gNBs (5G base station is referred to gNB in 3GPP), even if the gNB① which is more lightly loaded has more scheduling capacities, the gNB① cannot help the gNB② which has higher load. Corresponding to the situation shown in FIG. 2, possible problems 1 and 2 are described as the following:

Problem 1: gNB capacity cannot be fully utilized, and cannot be used to the fullest. When traffic in the overlapped beam coverage area is heavy, the light-load gNB① cannot cooperate, which is difficult to make full use of its scheduling capability; the heavy-load gNB② has insufficient scheduling capability, resulting in scheduling delay.

Problem 2: since a large amount of time-frequency resources of the light-load gNB① are wasted, while heavy-load gNB② has no resources available, throughput would be lost for entire 5G system.

Combining the scenario shown in FIG. 2 above, from the perspective of a UE side (which can be appreciated as user equipment side), when the UE is in a scheduling area of a cell under heavy-load gNB②, required data cannot be scheduled in time, which will cause traffic delay and service interruption if it is more serious, thereby seriously affecting UE's service experience.

Figure 3:
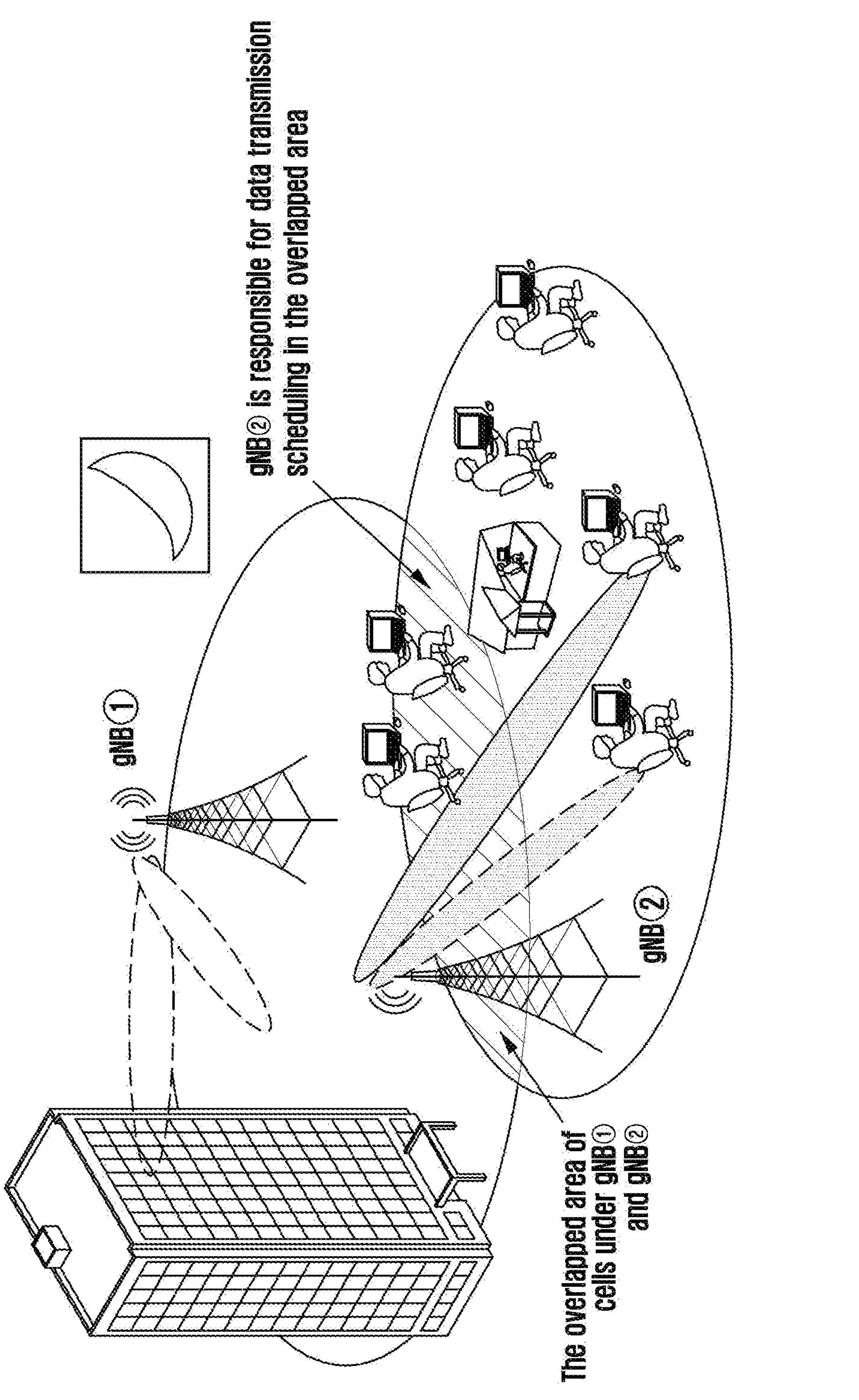
FIG. 3 is a schematic diagram of beam scheduling according to an embodiment of the disclosure.

FIG. 3 is a schematic diagram of beam scheduling according to an embodiment of the disclosure.

In order to better illustrate the problems in the corresponding actual application scenarios in the prior art, it is described in conjunction with FIG. 3: for the actual application scenarios shown in FIG. 3, in night, there is no data transmission in a cell under gNB① which does not need to perform scheduling operations, and therefore, the scheduling capability of gNB① is not used; however, the data transmission requirements in each beam coverage area in a cell under gNB② are very large, which traffics in the overlapped beam coverage area can only be scheduled by gNB②, and therefore, the scheduling requirements of the traffics in the overlapped beam coverage area between gNB① and gNB② cannot be met in time, and there is a problem of scheduling delay. In embodiments of the disclosure, the overlapped coverage area may also be referred to as an overlapped area.

In view of at least one of the above-mentioned technical problems or requirements for improvement in the prior art, the solution of the disclosure enables 5G base stations to cooperatively schedule services in overlapped coverage areas according to the current status of cells under each base station, and dynamically adjust the number of beams and beam coverages corresponding to cells under base station(s), so as to fully use scheduling capabilities of each base station in the network, thereby improving system throughput and reducing data transmission delay.

The technical solution of the disclosure and how the technical solution of the present application solves the above technical problems will be described in detail below with specific embodiments. The following several specific embodiments can be combined with each other, and the same or similar concepts or processes may not be repeated in some embodiments. The embodiments of the disclosure will be described below with reference to the drawings.

The technical solutions provided by the embodiments of the disclosure may be applicable to various systems, especially to 5G systems. For example, a applicable system may be a global system of mobile communication (GSM) system, code division multiple access (CDMA) system, and wideband code division multiple access (WCDMA) general packet wireless service (GPRS) system, long term evolution (LTE) system, LTE frequency division duplex (FDD) system, LTE time division duplex (TDD) system, long term evolution advanced (LTE-A) system, universal mobile telecommunication (UMTS) system, worldwide interoperability for microwave access (WiMAX) system, 5G new radio (NR) system, etc. These various systems include user equipment and network devices. The systems may also include core network parts, such as an evolved packet system (EPS), 5G system (5GS), etc.

Figure 4:
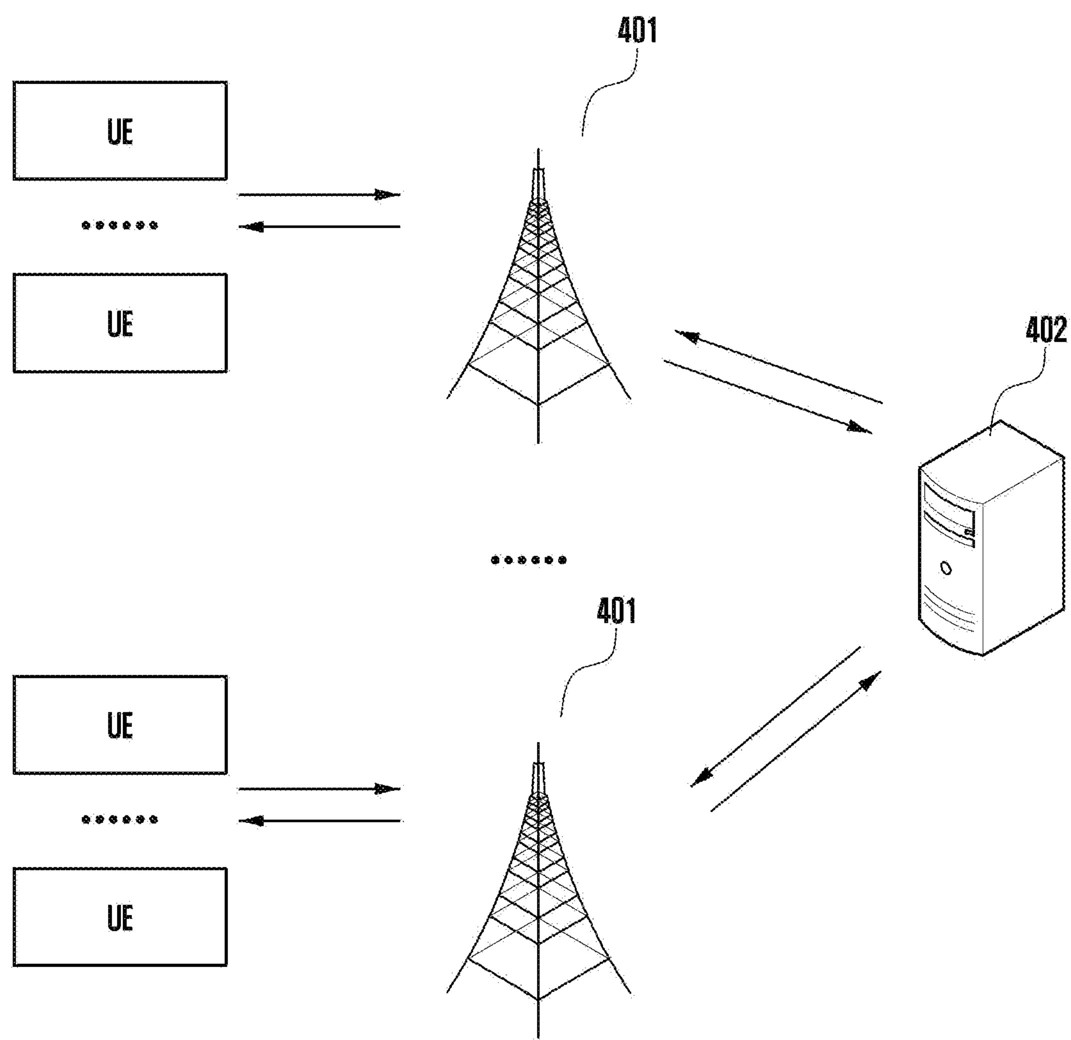
FIG. 4 is an application environment diagram of a cooperative scheduling method provided according to an embodiment of the disclosure.

FIG. 4 is an application environment diagram of a cooperative scheduling method provided according to an embodiment of the disclosure.

Wherein, FIG. 4 schematically shows a schematic structural diagram of an application environment of an embodiment of the disclosure. Referring to FIG. 4, the environment may include: several user equipment and several network devices (e.g., base stations 401).

A user equipment can communicate with one or more core networks via a radio access network (RAN). The user equipment may be a device that provides voice and/or data connectivity to a user, a handheld device with a wireless connection function, or other processing devices connected to a wireless modem, etc. In different systems, the user equipment may have different names, for example, in a 5G system, the user equipment may be called a wireless user equipment (UE). A wireless user equipment can communicate with one or more core networks (CN) via a radio access network (RAN). The wireless user equipment can be a mobile user equipment, such as a mobile phone (or "cellular" phone) and computers with mobile user equipment, which, for example, can be portable, pocket-sized, handheld, computer-built or vehicle-mounted mobile devices, and may exchange language and/or data with the wireless access network. For example, it includes personal communication service (PCS) phones, cordless phones, session initiated protocol (SIP) phones, wireless local loop (WLL) stations, and personal digital assistant (PDA) and other devices. The wireless user equipment can also be referred to as a system, subscriber unit, subscriber station, mobile station, mobile, remote station, access point, remote user equipment (remote terminal), access user equipment (access terminal), user equipment (user terminal), user agent, user device, which are not limited in the embodiments of this application.

The network device may be a base station 401, and the base station may include one or more cells that provide services for terminals. Depending on specific application scenarios, a base station may also be called an access point, or may be a device that communicates with wireless user equipment through one or more sectors on air interface in an access network, or other names. The network device can be used to exchange the received air frames and Internet Protocol (IP) packets, as a router between the wireless user equipment and the rest of the access network, where the rest of the access network can include the Internet Protocol (IP) communication network. The network device can also coordinate the attribute management of the air interface. For example, the network device involved in embodiments of the disclosure may be a network device (Base Transceiver Station, BTS) in the Global Mobile Communication (GSM) system or Code Division Multiple Access (CDMA) system, a network device (NodeB) in Wide-band Code Division Multiple Access (WCDMA), or an evolved network device (evolutional Node B, eNB or e-NodeB) in long term evolution (LTE) system, or a 5G base station (gNB) in 5G network architecture (next generation system), and can also be a Home evolved Node B (HeNB), relay node (relay node), femto, pico, etc., which are not limited in embodiments of the disclosure. In some network structures, network devices may include centralized unit (CU) nodes and distributed unit (DU) nodes, and centralized units and distributed units may also be geographically separated.

The network device and the user equipment can each use one antenna for transmission or multiple antennas for multiple input and multiple output (Multi Input Multi Output, MIMO) transmission. MIMO transmission can be Single User MIMO (SU-MIMO) or Multiple User MIMO (MU-MIMO). According to the form and number of antenna combinations, MIMO transmission can be 2D-MIMO, 3D-MIMO, FD-MIMO or massive-MIMO, and it can also be diversity transmission, precoding transmission, or beamforming transmission.

Specifically, as shown in FIG. 4, the cooperative scheduling method provided by the disclosure can be used in the following scenarios: multiple base stations 401 receive information related to the status of the UE, such as capability information, service requirement information, and channel state information of multiple UEs; multiple base stations 401 transmit, to the server 402, information related to base station status (e.g., neighbor cell relationship information corresponding to cells under the base station, traffic volume information, etc.) and the received UE status information, and the server 402 determines configuration information for cooperative scheduling on traffics in the overlapped beam coverage area, based on the information reported by the base station 401; the server 402 transmits the configuration information to the corresponding base station 401, and the base station 401 performs the cooperative scheduling based on the configuration information.

The foregoing is only an application example of the cooperative scheduling method of the disclosure, and does not limit the specific application scenarios of the cooperative scheduling method of the disclosure. In other examples, the cooperative scheduling method can also be applied to a base station (for example, one of multiple base stations can be selected as the primary base station to perform the method), and other base stations other than the primary base station may obtain the status information of multiple UEs and then transmit their own information and related information of the UE to the primary base station, and the primary base station performs the related information to determine the configuration information for cooperative scheduling on traffics in the overlapped beam coverage area, and transmit the configuration information to other base station, thereby all base stations performing cooperative scheduling according to the configuration information.

Figure 5:
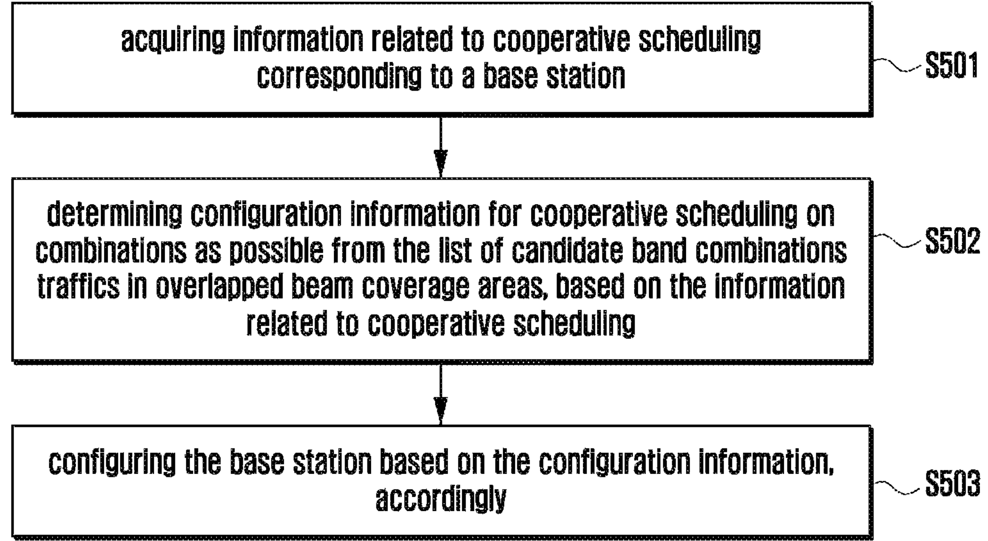
FIG. 5 is a schematic flowchart of the cooperative scheduling method provided according to an embodiment of the disclosure.

FIG. 5 is a schematic flowchart of the cooperative scheduling method provided according to an embodiment of the disclosure.

The embodiment of the application provides a possible implementation. Referring to FIG. 5, a cooperative scheduling method is provided, which can be applied to the network-side control node 402 shown in FIG. 4, and the network-side control node may be a SON (Self Organization network) server. A SON server refers to a network function module that can simultaneously control or coordinate multiple base stations. A SON server can also be called a SON agent, which can be composed of one or more entities. When the SON server is composed of multiple entities, each entity has its own corresponding name. The network-side control node can also be an Open Radio Access Network (RAN) Intelligent Controller (ORAN RIC) entity or other nodes that can collect relevant base station information and transmit processed configuration information to the base station. Optionally, the network-side control node can be a node independent of the base station (such as a manager), or can be used as a node in the base station (for example, assuming that multiple base stations are currently included, one base station can be selected as the primary base station to determine the configuration information, and then the primary base station transmits the configuration information to other base stations). In the following embodiments, the SON server is used as the executive body for description, and reference can be made to FIGS. 17 and 18; specifically, the cooperative scheduling method may include the following operations S501-S503:

Operation S501, acquiring information related cooperative scheduling corresponding to a base station.

Specifically, the server may collect status information related to the base station and/or UE from the 5G base station gNB, and determine the corresponding information related to cooperative scheduling.

Figure 6:
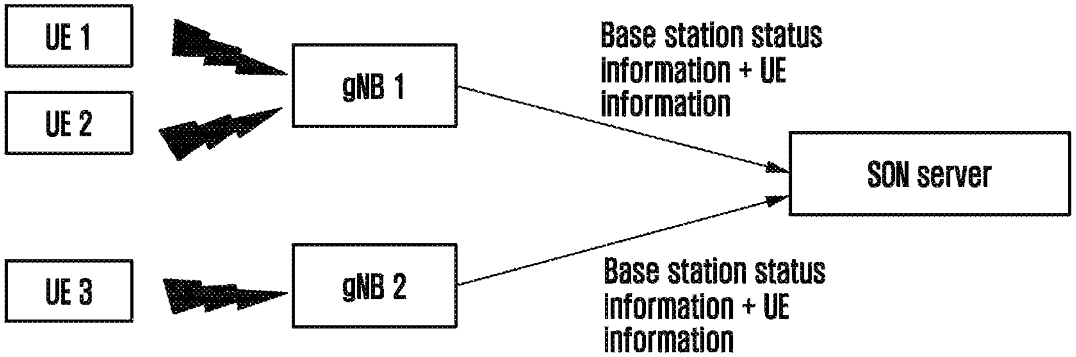
FIG. 6 is a schematic diagram of a solution for a server to obtain data of a base station and for a UE to report data according to an embodiment of the disclosure.

FIG. 6 is a schematic diagram of a solution for a server to obtain data of a base station and for a UE to report data according to an embodiment of the disclosure.

Referring to FIG. 6, the UE may report data communicated with the base station to the server through the base station, that is, the information reported by the base station to the server may include information reported by the UE to the base station and information of the base station itself.

Optionally, the data communicated between the UE and the base station may include UE channel status information, data transmission requirement information, and UE measurement information (it may include measurement ID, measurement result of the serving cell). Wherein, in the UE measurement information, according to different status of the UE, the UE measurement information can be divided into the measurement information in the idle status (Radio Resource Control_IDLE, RRC_IDLE) and the connected status (Radio Resource Control_CONNECTED, RRC_CONNECTED); according to the different types of measurements of the UE, the UE measurement information can be divided into intra-frequency measurement information (measurement on the downlink carrier frequency of the serving cell), inter-frequency measurement information (measurement on a downlink carrier frequency different from the serving cell), and inter-radio access technology (Inter-RAT) measurement information.

Optionally, the information of the base station itself may include information characterizing status of the base station, for example, including at least one of the following: base station location information (characterizing geographic location or geographic area where the base station, a cell under the base station, a radio-frequency unit corresponding to the cell under the base station, and an antenna are located), base station antenna configuration information, beam weight information corresponding to a cell under the base station, information about the number of UEs corresponding to beams in the cell under the base station, beam traffic information, information on mapping relationship of beams and the cell, information on the number of UEs corresponding to the cell under the base station, cell traffic information, information on neighbor relationship corresponding to the cell under the base station, traffic delay information corresponding to the cell under the base station, resource utilization information corresponding to the cell under the base station, and scheduling capability information of the base station. Wherein, the base station antenna configuration information may include information such as antenna size, orientation, downtilt angle, and other software and hardware configuration parameters of the antenna; the information on the number of UEs corresponding to the beams in the cell under the base station may include information such as the number of UEs in connected status and the number of UEs in active status; the information on the number of UEs corresponding to the cell under the base station may include information such as the number of UEs in connected status and the number of UEs in active status (the information on the number of UEs corresponding to the cell under the base station may be the sum of the information on the number of UEs corresponding to the beams in the cell under the base station); the resource utilization information may be utilization of physical resource block or resource utilization measured by other method; the information on neighbor relationship corresponding to the cell under the base station may be neighbor relationship determined by a list of cells adjacent to the cells under the base station or by other rules (e.g., handover priorities).

Wherein, the cell under the base station can refer to all cells under the base station, or can refer to one, two or more cells under the base station.

Considering that the base station includes a large amount of information, the base station generally does not actively upload all the information to the server, unless a certain function of the server has a clear demand. In the disclosure, the function of the server may be to coordinate the base station to perform cooperative scheduling on traffics in the overlapped beam coverage area, and then the base station may be configured to periodically or non-periodically report information related to cooperative scheduling. Wherein, periodic reporting can be reported once every 15 minutes; non-periodic reporting can be reported when certain conditions are met, for example, reporting when data deviation is greater than a set threshold (e.g., the difference between the predicted PRB utilization and the actual detected PRB utilization is greater than the set threshold).

Optionally, when the base station reports information related to cooperative scheduling, the following two situations are included in the process of one report:

(1) the information corresponding to all cells under the base station is reported, for example, when the base station includes 3 cells, and when the information corresponding to the 3 cells is obtained, the information of the 3 cells is reported at once;

(2) the information corresponding to one or more cells under the base station is reported, for example, when the base station includes 3 cells, and when the information corresponding to one cell is obtained, the information of the one cell is directly reported without waiting for information on other cells under the same base station.

Optionally, when the server obtains the information related to cooperative scheduling corresponding to the base station, it may be performed for multiple base stations currently managed; wherein, the multiple base stations currently managed by the server may be all base stations managed by the server, or a portion of base stations managed by the server; for example, the server can select some base stations according to geographic area (such as urban areas or hotspots, etc.) or according to base station load (such as base stations whose average load is greater than a threshold in the historical load of base stations) to perform the cooperative scheduling method provided by this application, that is, select some base stations to obtain the information related to cooperative scheduling.

Operation S502, determining configuration information for cooperative scheduling on traffics in overlapped beam coverage areas, based on the information related to cooperative scheduling.

Specifically, the server can determine from the information reported by the base station that there are overlapped beam coverage areas between cells under the base station, and then coordinate and determine which cell under the base station performs the scheduling of traffics in the overlapped beam coverage area, according to the status of the corresponding at least two cells (one same beam coverage area may be overlapped by two or more cells, and multiple cells with overlapping relation may belong to a same base station or difference base stations). For example, if the current base station 1 and base station 2 have overlapped beam coverage area A, the configuration information for cooperative scheduling of the base station corresponding to the beam coverage area A is determined by comparing the status of the cell under base station 1 and the cell under base station 2. The cooperative scheduling on traffics in the overlapped beam coverage area A may include the following two situations (assuming that traffics in the beam coverage area A are currently scheduled by cells under the base station 2): (1) traffics in the beam coverage area A are continuously scheduled by the cells under the base station 2; and (2) traffics in the beam coverage area A are scheduled by cells under the base station 1. Specifically, the relevant content of the configuration information and the specific implementation operation of the cooperative scheduling will be described in the subsequent embodiments.

Wherein, the overlapped beam coverage area refers to the overlapped coverage of beam scheduling between cells, which can be between cells under the same base station, or between cells under different base stations.

Operation S503, configuring the base station based on the configuration information, accordingly.

Specifically, in operation S503, the configuring the base station based on the configuration information may include: transmitting the determined configuration information to the corresponding base station, so that the corresponding base station performs cooperative scheduling based on the received configuration information. The specific situation of the base station performing tasks of cooperative scheduling will be described in subsequent embodiments.

In one embodiment, since that the cooperative scheduling may involve changes in the resources of cells under two base stations or changes in the resources of different cells under the same base station, in this case in operation S502, it will determine different configuration information for the scheduling required by different base stations, and in operation S503, it will configure different configuration information for different base stations.

In the above embodiment, in order to make better use of the scheduling capabilities of the base station and limited time-frequency domain resources, the server obtains the information related to cooperative scheduling reported by the base station, and determines the configuration information for the cells under the base station to perform cooperative scheduling on traffics in the overlapped beam coverage area, then transmits the determined configuration information to the corresponding base station, such that the base station performs cooperative scheduling operations, thereby making full use of the scheduling capabilities of the base stations in the network, achieving the effect of improving system throughput and reducing user data transmission delay.

The specific process of determining the configuration information based on the information related to cooperative scheduling will be described in detail below with reference to the accompanying drawings and embodiments.

In one possible embodiment, operation S502 of determining configuration information for cooperative scheduling on traffics in overlapped beam coverage areas, based on the information related to cooperative scheduling, includes operations S5021-S5022:

Operation S5021, determining the beam coverage area to be serviced by the cell under the base station based on the information related to cooperative scheduling; and operation S5022, determining the configuration information of the cell based on the beam coverage area to be serviced by the cell.

Wherein, the beam coverage area to be serviced by the cell under the base station can be reflected by beam coverage area pattern information, which can be used to determine which specific cell of the base station schedules a certain beam coverage area, or when cooperative scheduling is executed on different cells under the same base station, to determine which cell of the base station schedules a beam coverage area which needs cooperative scheduling. Specifically, the beam coverage area pattern information includes the following three situations: (1) the beam coverage area currently serviced by the cell needs to be cooperatively scheduled by other cells; (2) the cell needs to cooperatively schedule the beam coverage area of other cells; (3) the beam coverage area currently serviced by the cell does not be cooperatively scheduled by other cells, nor the cell needs to cooperatively schedule the beam coverage area of other cells. The configuration information is used to determine the specific cooperative scheduling configuration (for example, different cooperation levels correspond to different cooperative scheduling configurations).

The following describes in detail the specific process of the server determining the beam coverage area to be serviced by the cell under the base station with reference to the accompanying drawings and embodiments.

Considering that a server usually manages multiple base stations and each base station may contain one or more cells. Therefore, in order to reduce the implementation complexity of determining the beam coverage area to be serviced by the cell, this application divides cells under multiple base stations currently managed by the server into groups to obtain multiple cooperative scheduling groups, and then determine beam coverage area to be serviced by each cell in the group, with the unit of group.

Wherein, the dividing cells under multiple base stations currently managed by the server into groups, may be performed for all base stations currently managed or for a portion of base stations, for example, to be performed by selecting a portion of base stations according to geographic area (such as urban areas or hotspots, etc.) or according to base station load (such as base stations whose average load is greater than a threshold in the historical load of base stations).

Specifically, when dividing respective cells into different cooperative groups, the disclosure may firstly determine cooperative weights between cells based on the predicted traffic volume in the overlapped beam coverage area between cells, and divide respective cells into different cooperative groups based on the cooperative weights. A cooperative weight may be the sum of predicted traffic volume corresponding to all overlapped beam coverage areas between two cells. On this basis, this application provides the following two cell dividing schemes (one of them may be selected for group dividing in specific implementation):

(1) Cell grouping scheme based on greedy algorithm;

(2) Cell grouping scheme based on relation graph.

Hereinafter, the scheme (1) will be described in detail with reference to FIGS. 7 and 8.

Specifically, Cell grouping scheme based on greedy algorithm performs the following operations A1-A3:

Operation A1: for all or part of the cells currently managed by the server, computing the cooperative weights between the cells. Since determining cooperative weights between cells based on predicted traffic volume in the beam coverage area overlapped between the cells, it may also be considered as computing cooperative weights between neighbor cells.

Figure 7:
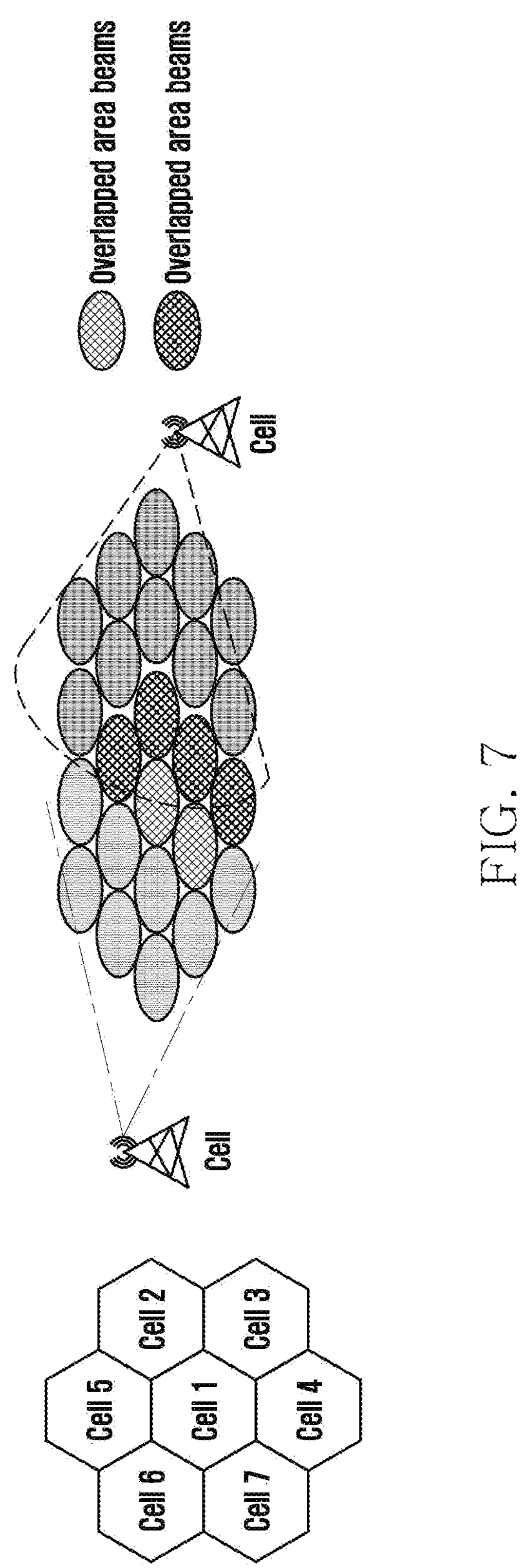
FIG. 7 is a schematic diagram of dividing cooperative scheduling groups provided according to an embodiment disclosure.

FIG. 7 is a schematic diagram of dividing cooperative scheduling groups provided according to an embodiment disclosure.

Referring to FIG. 7, it is assumed that the cells under the base station currently managed by the server include Cell 1 to Cell 7 (Cell represents a cell in this application). If Cell 5 is currently being processed, the cooperative weights computed in operation A1 includes: the cooperative weight between Cell 5 and Cell 6, the cooperative weight between Cell 5 and Cell 1, and the cooperative weight between Cell 5 and Cell 2.

Specifically, as shown in FIG. 7, the current overlapped area beams include the beams scheduled by the left cell and the beams scheduled by the right cell; the computed cooperative weight is the sum of all the predicted traffic volumes of all current overlapped area beams, and a high cooperative weight represents that these two cells may require cooperative scheduling. It should be noted that the left cell and the right cell may belong to the same gNB or may belong to different gNB s.

Specifically, the predicted traffic volume can be determined by the server by analyzing the historical traffic volume information in cells under the base station, or may be reported to the server after the base station predicts and obtains it based on the historical traffic volume information of the cells; alternatively, the base station or the server may determine the predicted traffic volume based on a regular method or artificial intelligence technologies. Wherein, the regular method can be linear filtering, infinite impulse response (IIR) filtering and other methods. The method based on artificial intelligence technologies can be a prediction method using Supported vector regression (SVR) and Long Short-Term Memory (LSTM) networks.

The following example illustrates the regular-based method to determine the predicted traffic volume: if it is assumed that the traffic volume between 10:00 on Nov. 5, 2020 and 11:00 on Nov. 5, 2020 is currently required, the historical traffic volume information for the same duration of three days before Nov. 5, 2020 (the number of days used for analysis can be adjusted according to actual needs) may be acquired to compute the average thereof as the predicted traffic volume between 10:00 on Nov. 5, 2020 and 11:00 on Nov. 5, 2020.

Specifically, in conjunction with FIG. 7, the relevant situation of the cooperative weight computed in operation A1 can be referred to the following Table 1:

TABLE 1

| | Cell 1 | Cell 2 | Cell 3 | Cell 4 | Cell 5 | Cell 6 | Cell 7 |
|---|---|---|---|---|---|---|---|
| Cell 1 | | 12 | 13 | 14 | 15 | 16 | 17 |
| Cell 2 | 12 | | 23 | | 25 | | |
| Cell 3 | 13 | 23 | | 34 | | | |
| Cell 4 | 14 | | 34 | | | | 47 |
| Cell 5 | 15 | 25 | | | | 56 | |
| Cell 6 | 16 | | | | 56 | | 67 |
| Cell 7 | 17 | | | 47 | | 67 | |

In Table 1, the reference number 12 represents the cooperative weight between Cell 1 and Cell 2, the reference number 23 represents the cooperative weight between Cell 2 and Cell 3, and the other reference numbers are analogous to this and will not be repeated herein.

Operation A2: dividing cells with highest cooperative weights into a same cooperative scheduling group.

Specifically, as shown in FIG. 7, the cooperative weight values computed based on the cells of the base station currently managed by the server includes 18 values. In operation A2, in combination with Table 1 above, two neighbor cells having the highest computed cooperative weight values are divided into the same cooperative scheduling group (assuming that the cooperative weight 47 between Cell 7 and Cell 4 is the largest, then Cell 7 and Cell 4 are divided into the cooperative scheduling group A).

Operation A3: repeating the following operations, until the number of cells in the cooperative scheduling group reaches to a first set value: including cells having the highest cooperative weight with existing cells (e.g., the cells Cell 7 and Cell 4 currently included in the group) in current cooperative scheduling group.

Specifically, in operation A3, for the cells that are not divided into the cooperative scheduling group (hereinafter referred to as the remaining cells), the operation, is repeated, of including cells having the highest cooperative weight with existing cells in current cooperative scheduling group(s), until the number of cell(s) of the cooperative scheduling group reaches to a first set value. Assuming that the first set value is 5, an example will be given in conjunction with the example shown in operation A2 above:

When the dividing operation is performed for the first time: the current cooperative scheduling group A includes Cell 7 and Cell 4, the remaining cells currently include Cell 1, Cell 2, Cell 3, Cell 5 and Cell 6; and then cells corresponding to the highest cooperative weight among cooperative weights corresponding to reference numbers 67, 17, 14, and 34, are divided into the cooperative scheduling group A (assuming that the cooperative weight corresponding to the reference number 34 is the highest, then Cell 3 is divided into the cooperative scheduling group A).

When the dividing operation is performed for the second time: the current cooperative scheduling group A includes Cell 7, Cell 14, and Cell 3, the remaining cells currently include Cell 1, Cell 2, Cell 5, and Cell 6; and then cells corresponding to the highest cooperative weight among cooperative weights corresponding to reference numbers 67, 17, 14, 13, and 23, are divided into the cooperative scheduling group A (assuming that the cooperative weight corresponding to the reference number 14 is the highest, then Cell 1 is divided into the cooperative scheduling group A).

When the dividing operation is performed for the third time: the current cooperative scheduling group A includes Cell 1, Cell 7, Cell 14, and Cell 3, the remaining cells currently include Cell 2, Cell 5, and Cell 6; and then cells corresponding to the highest cooperative weight among cooperative weights corresponding to reference numbers 67, 16, 15, 12, and 23, are divided into the cooperative scheduling group A (assuming that the cooperative weight corresponding to the reference number 15 is the highest, then Cell 5 is divided into the cooperative scheduling group A).

Since that the current cooperative scheduling group A includes 5 cells of Cell 1, Cell 5, Cell 7, Cell 4, and Cell 3 which have reached to the first set value, the execution of operation A3 ends. At this time, the remaining cells include non-adjacent Cell 2 and Cell 6.

In one possible embodiment, after operation A3, the method further includes: for a cell that is not divided into any cooperative scheduling group, respectively comparing the cooperative weights between this cell and each cell in existing cooperative scheduling groups, and dividing the cell into the cooperative scheduling group corresponding to the cell with highest cooperative weight.

Specifically, the implementation of the above steps is to add the non-adjacent cells obtained after the execution of operation A3 to a specific cooperative scheduling group. For non-adjacent cells, cooperative weights thereof are compared with cooperative weights of adjacent cells that have been divided into cooperative scheduling groups, and the non-adjacent cells are added into the cooperative scheduling group corresponding to the highest cooperative weight.

Figure 8:
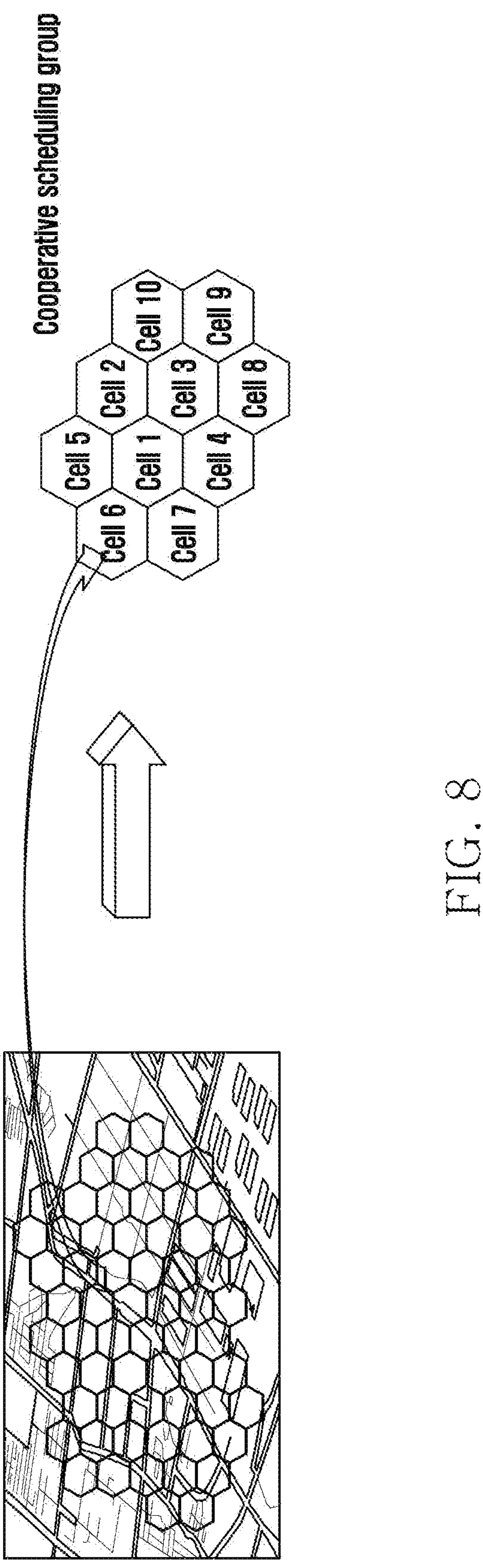
FIG. 8 is another schematic diagram of dividing cooperative scheduling groups provided by according to an embodiment of the disclosure.

FIG. 8 is another schematic diagram of dividing cooperative scheduling groups provided by according to an embodiment of the disclosure.

Referring to FIG. 8, the left side of FIG. 8 shows the cells under all base stations currently managed by the server, and the right side shows the cells divided into the same cooperative scheduling group (FIG. 8 and FIG. 7 are different examples).

Through dividing cells under the base stations into groups based on the above-mentioned scheme (1), cells with great cooperative potential may be divided into the same cooperative scheduling group to achieve better cooperation effects. It should be noted that different cells under the same base station can be divided into different cooperative scheduling groups.

Figure 9:
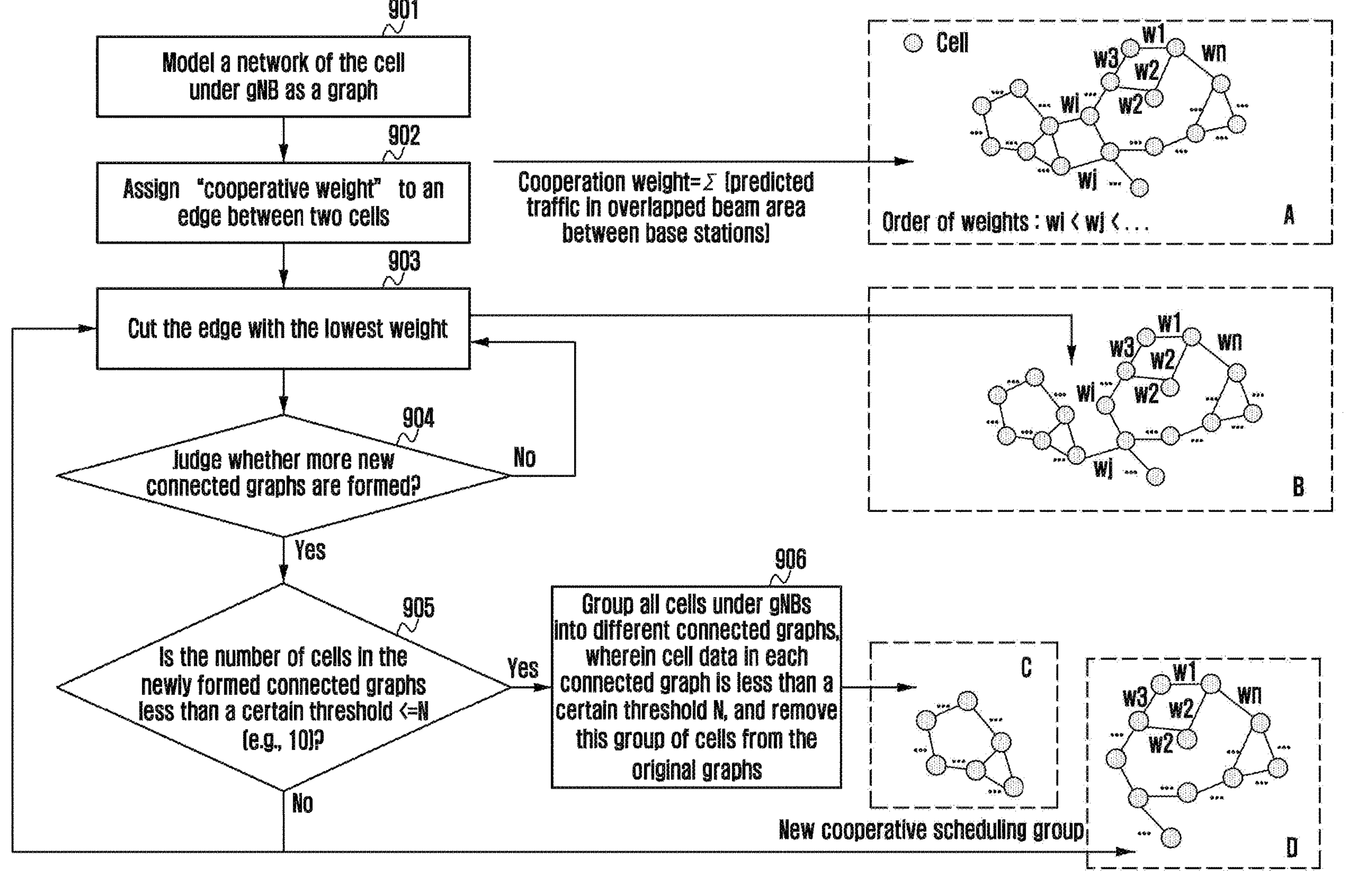
FIG. 9 is a flowchart of dividing cooperative scheduling groups based on a relationship graph according to an embodiment of the disclosure.

FIG. 9 is a flowchart of dividing cooperative scheduling groups based on a relationship graph according to an embodiment of the disclosure.

Hereinafter, the scheme (2) will be described in detail with reference to FIG. 9.

Specifically, Cell grouping scheme based on relation graph may include the following operations:

Operation 901: acquiring a cell relation graph (modeling the network of the cells under the gNBs as a graph and, in operation 902, assigning the "cooperative weight" to the edge between two cells); in the cell relation graph, cells are presented by points, and cooperative relation between cells are presented by edges; cooperative relation includes cooperative weights.

Specifically, the cell relation graph may be created by the server based on the cells under the currently managed base stations.

Referring to FIG. 9, points are used to represent cells under the base stations, and edges represent the cooperative relation between cells. The currently acquired cell relation graph is shown in graph A. Optionally, the cooperative relation may include whether the cells are adjacent or not, and the cooperative weight between the cells. Wherein, the computation scheme of the cooperative weight can refer to the content described in operation A1 above.

Operation 904: judging, every after performing the following operation 903 on cutting, whether an independent relationship graph in which the number of cells is less than a second set value is formed, and if yes, dividing corresponding cells into a same cooperative scheduling group, and if not, performing the following operation 903 on cutting continually until all cells are divided into corresponding cooperative scheduling groups: operation 903, cutting an edge with the lowest cooperative weight between cells from the cell relationship graph.

Specifically, as shown in FIG. 9, operation 903 is executed based on schematic graph A to remove the edge with the lowest cooperative weight between cells in the cell relation graph, and the result is shown in schematic graph B corresponding to operation 903 of the flowchart; after performing operation 903 once, at operation 905, it is judged whether an independent relationship graph in which the number of cells is less than a second set value is formed (i.e., judging whether a new connection graph is formed), this is because that the cell relation graph corresponding to the schematic graph B does not form an independent relation graph in which the number of cells is less than the second set value. Therefore, operation 903 is continuously to be executed, while a relation graph (also referred to as a connection graph or a connected graph) formed based on the schematic graph B is as shown in the schematic graph C and the schematic graph D. Furthermore, it is judged whether an independent relation graph in which the number of cells is less than the second set value (or equal to the second set value) is currently formed. Assuming that the current second set value is 10, the number of cells in the relation graph shown in graph C is less than the second set value, and the corresponding cells in the relation graph are divided into the same cooperative scheduling group (that is, cells under gNB are grouped into different connection graphs, wherein the number of cells in each connection graph is less than the threshold N, and this group of cells is removed from the original graph at operation 906); and the number of cells in the relation graph shown in graph D is greater than the second set value, and then relation graph shown in graph D is continuously executed by operation 903, until all cells shown in graph A are divided into the relation graph where the number of cells is less than the second set value (until all cells are divided into corresponding cooperative scheduling groups).

Specifically, as shown in FIG. 9, in this application, the relationship graph may also be referred to as a connection graph.

Optionally, the first set value and the second set value involved in the scheme (1) and the scheme (2) can be set to the same numerical value, or can be set to different numerical values, which are not limited in the disclosure. In addition, based on the foregoing process, it can be seen that multiple cells under one base station may be divided into a same cooperative scheduling group or may be divided into different cooperative scheduling groups. In order to simplify the grouping of cells, special rules can also be set in the actual implementation process to dividing the cells under the same base station into the same cooperative scheduling group, for example: scheme A, dividing all cells under the base station into the cooperative scheduling group corresponding to most cells; scheme B, considering, when using the above-mentioned greedy algorithm or relation graph method to group cells, all cells under the base station as one cell, etc.

The following describes the specific process of determining the beam coverage area pattern information of the cells under the base station (determining the beam coverage area to be serviced by the cell) based on the information related to cooperative scheduling in the in conjunction with the accompanying drawings and embodiments. Optionally, the process can be performed on the basis of dividing cooperative scheduling group (at this time, processing will be performed on the cells in each group), or on the basis of not dividing cooperative scheduling group.

In one embodiment, operation S5021 of determining the beam coverage area to be serviced by the cell under the base station based on the information related to cooperative scheduling, includes the following operations C1 to C3:

Operation C1, determining scheduling status information of the cell under the base station based on the information related to cooperative scheduling.

Optionally, a regular-based method or artificial intelligence technologies may be used to perform operation C1 to determine the current scheduling status information of the cell under the base station. Wherein, the regular method can be linear filtering, infinite impulse response (IIR) filtering and other methods. The method based on artificial intelligence technologies can be a prediction method using Supported vector regression (SVR) and Long Short-Term Memory (LSTM) networks.

Optionally, in this embodiment, the scheduling status information of the cell under the base station is also determined based on the mapping relation between the beam and the cell. For example, which base station corresponds to which cell or cells, and which cell corresponds to which beam or beams.

Wherein, the scheduling status information of the cell includes the predicted resource utilization and the number of active beams; optionally, the predicted resource utilization and the number of active beams may be included in the information related to cooperative scheduling, that is, the information is reported to the server after being predicted or may also be predicted by the server based on information related to cooperative scheduling.

Specifically, whether the scheduling status information of the cell is predicted by the server or is predicted by the base station and reported to the server, the following prediction methods can be used. Operation C1 includes the following operations C11-C12:

Operation C11: acquiring resource utilization information included in each beam of the base station within a preset duration before the preset time based on the information related to cooperative scheduling.

Specifically, if determining resource usage of each beam of the base station based on artificial intelligence technology AI, assuming that it is currently necessary to predict resource utilization of a certain beam or certain beams within 10 minutes (within the preset time) starting from 7:00 on Jun. 24, 2020, then history resource utilization corresponding to the beam or beams from 7:00 on Jun. 21, 2020 to 6:50 on Jun. 24, 2020 may be obtained. Wherein, the resource utilization information may be PRB utilization.

Specifically, if determining resource usage of each beam of the base station by the regular-based method, assuming that it is currently necessary to predict resource utilization of a certain beam or certain beams within 10 minutes (within the preset time) starting from 7:00 on Jun. 24, 2020, then history resource utilization corresponding to the beam or beams of 7:00-7:10 on Jun. 21, 2020, 7:00-7:10 on Jun. 22, 2020, and 7:00-7:10 on Jun. 23, 2020 may be obtained.

Wherein, the resource utilization information may be PRB utilization. The preset time and the preset duration can be adjusted according to actual cooperative scheduling requirements, which is not limited in this application.

Operation C12: determining the scheduling status information of the cell under the base station within a preset time based on the resource utilization information.

Figure 10:
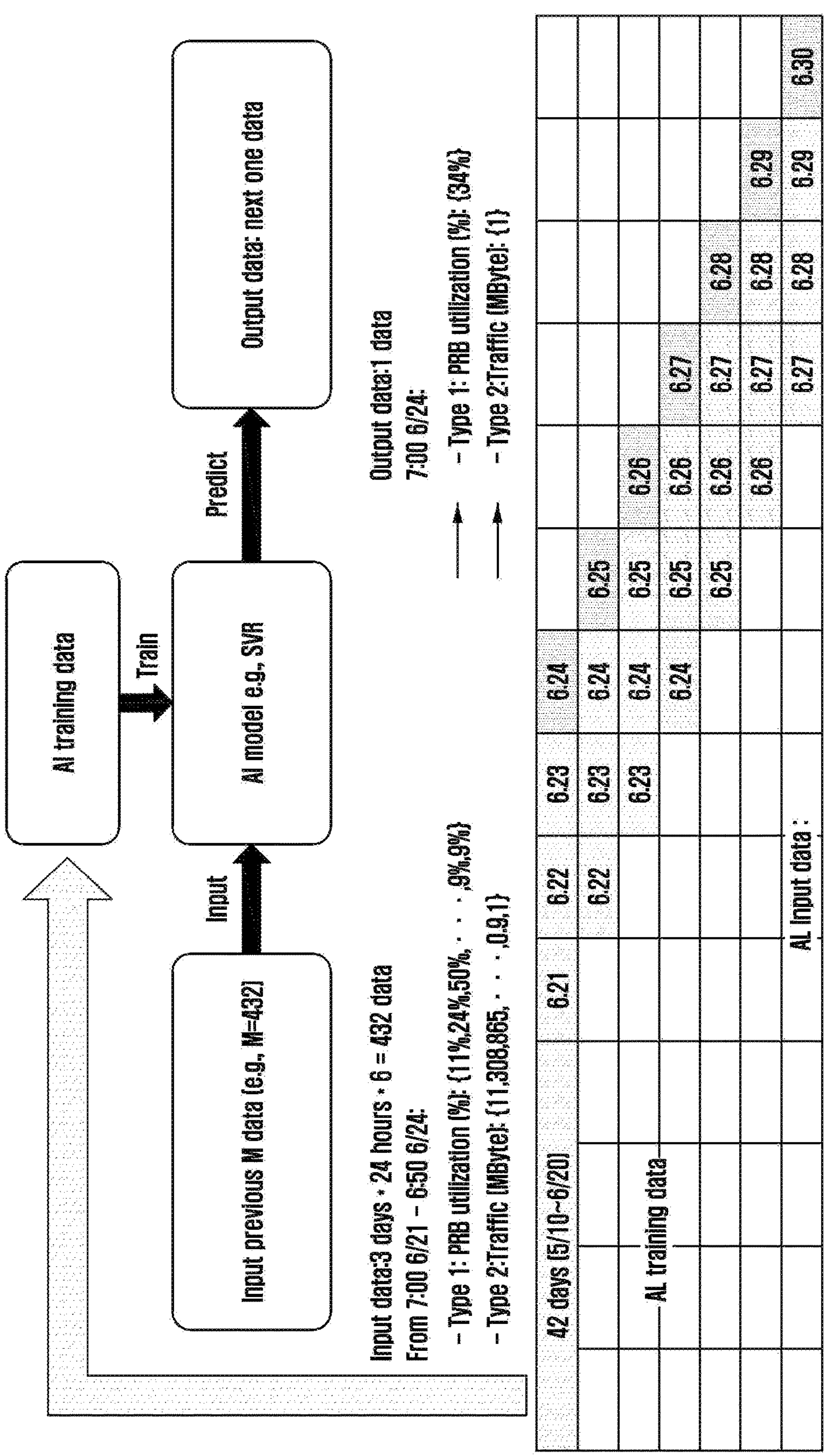
FIG. 10 is a schematic diagram of predicting resource utilization and traffic based on an AI mode according to an embodiment of the disclosure.

The following two schemes can be used to determine the scheduling status information of the cell under the base station within the preset time:

Scheme 1: A Scheme Based on Artificial Intelligence AI:

FIG. 10 is a schematic diagram of predicting resource utilization and traffic based on an AI mode according to an embodiment of the disclosure.

Specifically, as shown in FIG. 10, when using AI technology to determine the scheduling status information of the cell under the base station, the data obtained in operation C11 is input into the AI model, and the end-to-end AI model (e.g., SVR) predicts the corresponding scheduling status information. Optionally, the AI model is trained with its own models for PRB utilization and traffic information. Referring to FIG. 10, the AI model is trained through AI training data (for example, using historical data (historical PRB utilization or historical traffic) within 42 days (May 10 to June 20) as AI training data), and then the AI model is used to predict the output data at the next moment (also can be called the next data). When operation C12 is executed, the historical data obtained in operation C11 is converted into input data M of the AI model, such as: M=3 days*24 hours*6=432 sets of data (wherein, 6=60 min/10 min).

Specifically, the PRB utilization (also called PRB usage ratio) is taken as an example. In the data input to the AI model, the PRB utilization is expressed as a percentage, for example, the input data M of a certain beam may include {11%, 24%, 50% 9%, 9%}, the output data of the corresponding AI model is the predicted resource utilization (PRB utilization) of the beam {34%}; after outputting the predicted resource utilization of the beam, the total resource utilization of the cell may be obtained by summing of predicted resource utilization corresponding to all beams included in the cell based on the mapping relation of beams and the cell. It can also be that the input data M of a certain cell can include {11%, 24%, 50% . . . 9%, 9%}, and the output data of the corresponding AI model is the predicted total resource utilization (PRB utilization) of the cell, {34%}.

Specifically, the traffic value (MByte) is taken as an example. In the data input to the AI model, the input data M corresponding to the traffic value of a certain beam may include 111, 308, 865, . . . , 0.9, 11, the corresponding output data of the AI model is predicted traffic value 111 of the beam; the input data M corresponding to the traffic value of a certain cell can include {11, 308, 865, . . . , 0.9, 1}, and the corresponding output data of the AI model is predicted total traffic value of the cell, {1}. The traffic value can be used to measure the traffic value. The foregoing method for predicting traffic values based on the AI model can be applied to predicting traffic delay involved in the embodiments of the disclosure.

Optionally, when determining the number of active beams of a cell under the base station, it is determined by the number of beams under the cell whose average resource utilization is greater than a set threshold in a set duration.

The foregoing values are only examples. Optionally, when a certain beam is used as a unit or a certain cell is used as a unit, the corresponding data amount input into the AI model or output from the AI model is different.

Scheme 2: A Regular-Based Scheme:

Specifically, when the scheduling status information of the cells under the base station is determined in a regular-based scheme, the data obtained in operation C11 may be used to predict the resource utilization and the number of active beams using a certain set rule.

Optionally, the data of each beam of the cell under the base station can be processed, and when determining the resource utilization of the cell under the base station, it may be determined by summing the predicted values obtained by the predicted resource utilization of each beam of the cell; when determining the number of active beams of a cell under the base station, it is determined by the number of beams under the cell whose average resource utilization is greater than a set threshold in a set duration.

In another embodiment, in the processing of operations C11 and C12, the data of all beams of the cell under the base station may be processed.

Operation C2, determining the type of the cell under the base station based on the scheduling status information of the cell under the base station, wherein the type includes one of a first type which needs cooperation, a second type with cooperative scheduling capability, and a third type which does not need cooperation or has no cooperative capability.

Specifically, in conjunction with the content shown in Table 2 below, the specific process of determining the type of the cell under the base station based on the scheduling status information of the cell under the base station is described.

TABLE 2

| First type | Second type | Third type |
|---|---|---|
| the number of predicted active beams > the first preset threshold<br>predicted resource utilization > second preset threshold | the number of predicted active beams < the third preset threshold;<br>predicted resource utilization < the fourth preset threshold | Not belonging to the first or second type |

In Table 2, the first preset threshold is not less than the third preset threshold; the second preset threshold is not less than the fourth preset threshold.

Specifically, in Table 2, the determining of cells under the base station as the first type includes two conditions, for which the cells may be determined as the first type when any condition is met; the determining of cells under the base station as the second type includes two conditions, for which the cells may be determined as the second type only when the two conditions are both met; a cell under the base station which cannot be determined as the first or second type is determined as the third type.

The execution of the above operation C2 divides the cells under the base station. Based on this, the corresponding beam coverage area pattern information can be determined based on the type of the cell under the base station, and then based on the beam coverage area pattern information, low-load cells under the base station are adjusted to release traffic pressure of high-load cells under base station.

Operation C3, determining the beam coverage area to be serviced by the cell based on the cell type.

Specifically, when the server determines the beam coverage area to be serviced by a cell under a certain base station, the beam coverage area that the cell can service is mainly determined according to the current scheduling capability of the cell. If the current load of the cell is too heavy, the overlapped beam coverage area between the cell and another cell is handovered to be serviced by the other cell.

Optionally, operation C3 of the determining the beam coverage area to be serviced by the cell based on the cell type, includes the following operations C31-C32:

Operation C31, determining a cell providing service to the overlapped beam coverage area, based on the cell type.

Wherein, the determining a cell providing service to the overlapped beam coverage area, based on the cell type, may include the following situations (assuming that there is an overlapped beam coverage area between cell 1 and cell 2, and the overlapped beam coverage area is serviced by cell 1):

(1) If cell 1 belongs to the first type requiring cooperation, the current load of cell 1 is too heavy; if the current cell 2 belongs to the second type with cooperative scheduling capability, then the current load of cell 2 is lighter; the overlapped beam coverage area between cells may be handovered to be serviced by cell 2.

(2) If cell 1 belongs to the third type not requiring cooperation and having no cooperative capability, the current load of cell 1 is normal, and the overlapped beam coverage area covered between the cells can be maintained to be serviced by cell 1.

(3) If both cell 1 and cell 2 belong to the first type requiring cooperation, then cell 1 continuously service the overlapped beam coverage area between cells to avoid affecting the service status of cell 2.

It can be seen from the above several situations that when determining a cell providing service to the overlapped beam coverage area between cells, it is mainly required to perform scheduling on the overlapped beam coverage area currently serviced by a cell belonging to the first type, and therefore, the disclosure provides the following embodiments of determining a cell providing service to which the beam coverage area requiring cooperative scheduling, which may effectively reducing the complexity of implementing embodiments of the disclosure. Optionally, the operating principle of the server performing operation C31 can be understood as: by finding beam coverage areas that currently requires cooperative scheduling and candidate serving cells of these areas, then according to the predicted resource utilization of the candidate serving cells, each beam coverage area requiring cooperative scheduling is added into a corresponding cell.

Specifically, operation C31 of determining a cell providing service to the overlapped beam coverage area, based on the cell type may include the following operations C311-C313:

Operation C311, determining a beam coverage area which needs cooperative scheduling, based on a beam coverage area overlapped by a cell belonging to the first type and another cell.

Specifically, the beam coverage areas that require cooperative scheduling can be described in the form of a list. Among the cells under the base station currently managed by the server, the beam coverage areas that are overlapped by the first type cells under base station and the other cells under base stations are determined as the beam coverage areas that require cooperative scheduling, and are record in the list of cooperative scheduling beam areas.

Optionally, since that multiple cells may be included in cells under the base stations currently managed by the server, there may be multiple cells under the base station requiring cooperation (belong to the first type) among the cells under the base station, and in this case, the disclosure mainly processes cells under the base stations requiring cooperation. Specifically, the cooperative scheduling beam coverage area list is used to describe overlapped beam coverage areas that may exist between the cells under the base stations belonging to the first type and other cells under base stations; optionally, the list can also be used to describe the relationship between overlapped beam coverage area and the corresponding cells under the base stations.

In one embodiment, the cooperative scheduling beam area list is also used to describe the relationship between the beam coverage area that requires cooperative scheduling and the predicted physical resource block utilization (predicted PRB utilization) corresponding thereto.

Operation C312, determining a candidate serving cell corresponding to the beam coverage area which needs cooperative scheduling, based on the beam coverage area which needs cooperative scheduling and types of respective cells.

Specifically, considering that the cells belonging to the third type have no cooperative capability, therefore, in order to reduce the complexity of the embodiments of the disclosure, when determining the candidate serving cell corresponding to the beam coverage area that requires cooperative scheduling, cells belonging to the second type are mainly selected; optionally, the candidate serving cell may include the cell (belonging to the first type) currently serving the beam coverage area that requires cooperative scheduling.

In one embodiment, the candidate serving cell list is determined based on the beam coverage areas in the cooperative scheduling beam coverage area list; the candidate serving cell list includes cells under the base stations that may be used to schedule the corresponding beam coverage areas and belong to the second type or the first type; the cells in the candidate serving cell list can belong to the same base station or different base stations.

Specifically, the cooperative scheduling beam coverage area list includes at least one beam coverage area, and for each beam coverage area in the list, a corresponding candidate serving cell list is determined. The following is described referring to the content shown in Table 3:

TABLE 3

| Beam coverage area identifier | Predicted PRB utilization | List of candidate serving cells |
|---|---|---|
| 15 | 10% | 2, 5 |
| 22 | 8% | 3, 9, 11 |
| 49 | 11% | 5, 8 |

In one embodiment, the cooperative scheduling beam coverage area list may include the correspondence between the beam coverage area identifiers and the predicted PRB utilization in Table 3. In another embodiment, as shown in Table 3, the related information in the cooperative scheduling beam coverage area list and the candidate serving cell list may be recorded in the same list, and this application does not limit the expression form.

Optionally, each cell label corresponding to the candidate serving cell list in Table 3 is a unique identifier ID, for example, candidate serving cells 5 corresponding to beam coverage areas 15 and 49 belong to the same cell. In one possible embodiment, the label form of the candidate serving cell may also be expressed in the form of (base station, cell), for example, cell 2 under base station 3 may be expressed as (3, 2).

In Table 3, the beam coverage area identifier indicates the beam coverage area where the cell under the base station belonging to the first type and other cells under base stations are overlapped; the predicted PRB utilization is the prediction value of the PRB utilization in each beam coverage area in the corresponding list, for which the prediction method may be referred to the prediction method shown in operation C1 above and would not be described in detail here. In addition, the candidate serving cell list shown in Table 3 is determined corresponding to each beam coverage area in the list. For example, the candidate serving cells corresponding to the beam coverage area 22 include 3, 9, and 11. Wherein, the types of the cells under the base station involved in the candidate serving cell list are all the first type or the second type, that is, the cells under the base station that require cooperation or have cooperative scheduling capabilities.

Operation C313, determining a cell providing service to the beam coverage area which needs cooperative scheduling, based on the candidate serving cell.

Specifically, cells corresponding to respective beam coverage areas requiring cooperative scheduling are determined based on candidate serving cells and the predicted PRB utilization.

In one embodiment, operation C313 includes performing the following steps until allocation of all beam coverage areas which need cooperative scheduling is completed: selecting a corresponding beam coverage area with the largest predicted resource utilization among beam coverage areas which need cooperative scheduling; and selecting a corresponding candidate serving cell with the lowest resource utilization among candidate serving cells corresponding to the selected beam coverage area, as the cell providing service to the selected beam coverage area.

Optionally, considering that when determining a cell providing service to the beam coverage area which needs cooperative scheduling, it needs to be processed in combination with the predicted PRB utilization corresponding to the candidate serving cell, the disclosure may set a cell information table for cells belonging to the first or second type currently managed by the server, and by using the table, describe the relationship between the cells and the predicted PRB utilization corresponding to the cells.

Specifically, the cell information table will be described with reference to Table 4 below:

TABLE 4

| Cell identifier | List of original beam coverage areas | predicted physical resource block utilization |
|---|---|---|
| 1 | 1, 2, 3, . . . , 30 | 55% |
| 2 | . . . | 68% |
| 3 | . . . | 32% |

It can be seen from Table 4 that the cells currently belonging to the first type or the second type under base station(s) include cell 1, cell 2, and cell 3. Each cell corresponds to its original beam coverage area list (the list includes all the beam coverage area identifiers of each cell). Wherein, in the original beam coverage area list, each original coverage area is a beam coverage area correspondingly managed by the current cell before the cooperative scheduling is performed. Specifically, the predicted resource utilization referred to in operation C313 may be the predicted physical resource block utilization (predicted PRB utilization), and since that the predicted PRB utilization corresponds to a certain cell under the base station (as shown in Table 4, the predicted physical resource block utilization corresponding to the cell 2 is 68%), the predicted physical resource block utilization shown in Table 4 is the sum of the predicted PRB utilization for each original beam coverage area.

Optionally, the cell identifier in Table 4 is a unique identifier. In one possible embodiment, the label form of the cells may also be expressed in the form of (base station, cell), for example, cell 3 under base station 1 may be expressed as (1, 3).

Optionally, the original beam coverage area list in Table 4 does not include the beam coverage areas involved in the cooperative scheduling beam coverage area list (Table 3).

In one embodiment, operation C313 further performs the operation of performing the following steps for each beam coverage area in the cooperative scheduling beam coverage area list until completing the allocation all beam coverage areas in the list: selecting a target beam coverage area with the highest predicted resource utilization in the cooperative scheduling beam coverage area list; selecting a target cell with the lowest predicted resource utilization from the candidate serving cell list corresponding to the selected target beam coverage area; configuring the target beam coverage area into the target cell; and updating the cooperative scheduling beam coverage area list and the candidate serving cell list corresponding to the beam coverage area.

Specifically, an example is given in combination with the content shown in Table 3:

First, the target beam coverage area 49 with the highest predicted resource utilization in Table 3 is selected, and then the target cell with the lowest predicted resource utilization (combined with the cell information table under the base station) is selected from candidate serving cells 5 and 8 (assumed to be a candidate serving cell 8), and then the target beam coverage area 49 is configured in the target cell 8. In addition, the target beam coverage area 49 in the cooperative scheduling beam coverage area list and its corresponding related information in the list (predicted PRB utilization and candidate serving cell list in Table 3) is deleted.

Second, the target beam coverage area 15 with the highest predicted resource utilization in Table 3 is selected, and then the target cell with the lowest predicted resource utilization is selected from candidate serving cells 2 and 5 (assumed to be a candidate serving cell 2), and then the target beam coverage area 15 is configured into the target cell 2. In addition, the target beam coverage area 15 in the cooperative scheduling beam coverage area and its corresponding related information in the list is deleted.

By analogy, the beam coverage area 22 included in Table 3 is then configured in the corresponding target cell, so that all beam coverage areas in the cooperative scheduling beam coverage area list are allocated.

Optionally, while updating the cooperative scheduling beam coverage area list and the candidate serving cell list, the information table of cells under the base station can also be updated synchronously. Updating the information table of cells under the base station can be understood as deleting information of a certain cell under the base station from the information table of cells under the base station, or updating the predicted PRB utilization corresponding to a certain cell under the base station, when a certain cell under the base station included in the information table of cells under the base station is configured to cooperatively schedule a target beam coverage area. Therefore, when the information table of cells under the base station is updated synchronously, the following two situations can be included:

(1) deleting the information related to a certain cell under the base station: as shown in Table 3, when the beam coverage area 49 is configured into the candidate serving cell 5, all information of the cell 5 of base station in the information table of cells under the base station is deleted; then, only the beam coverage area 15 is configured in the candidate serving cell 2.

(2) updating the information related to a certain cell under the base station: as shown in Table 3, when the beam coverage area 49 is configured into the candidate serving cell 5, the predicted PRB utilization corresponding to cell 5 under the base station (the predicted PRB utilization is different from a predicted PRB utilization when the beam coverage area 49 is configured) is updated; in turn, when the beam coverage area 15 is configured, the predicted PRB utilization corresponding to candidate serving cells 2 and 5 need to be compared.

In one possible embodiment, when updating the cooperative scheduling beam coverage area list and the candidate serving cell list, the information table of cells under the base station is not required to be updated. Therefore, as shown in Table 3, when the beam coverage area 49 is configured in the candidate serving cell 5 and the beam coverage area 15 is configured, the beam coverage area 15 can be configured in the candidate serving cell 2 or 5 (determined by comparing the predicted PRB utilization of these 2 cells).

Specifically, in the above steps, the contents shown in Table 3 and Table 4 do not belong to the same corresponding example.

Operation C32, determining the beam coverage area(s) serviced of each cell, based on the cell providing service to the overlapped beam coverage area.

Specifically, operation C32 respectively determines the beam coverage areas serviced by respective cells based on the results performed in operation C31.

Figure 11:
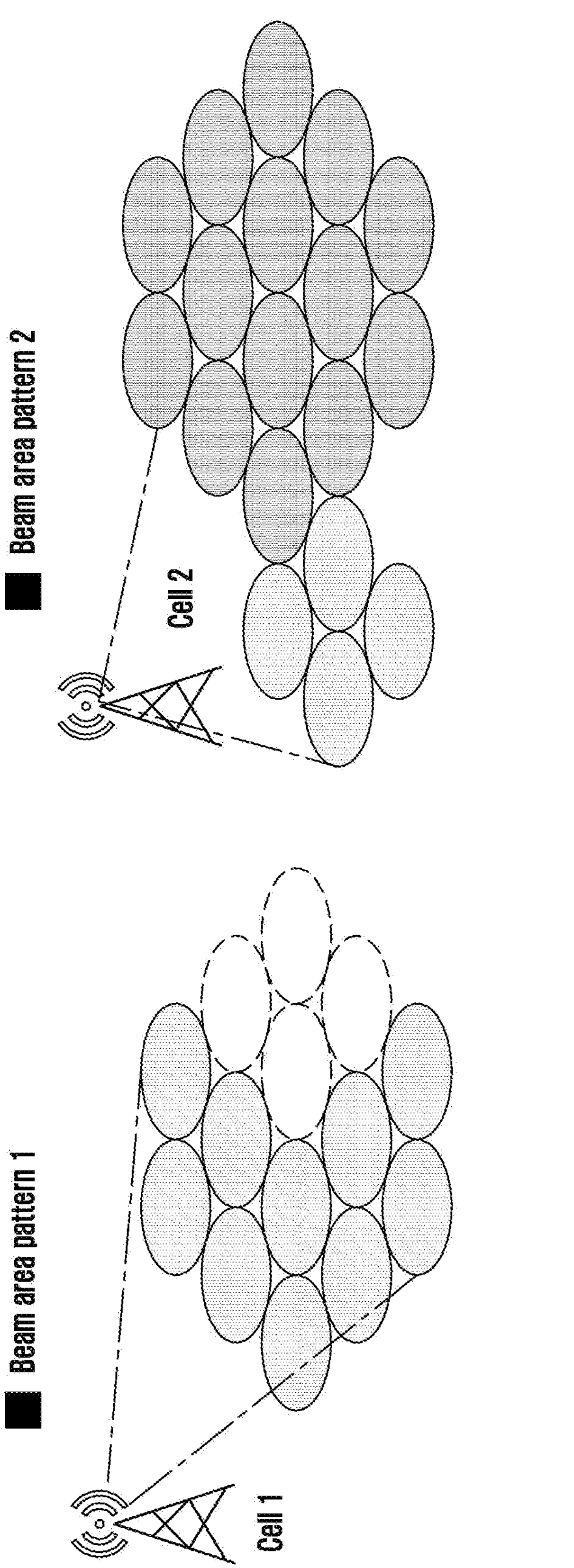
FIG. 11 is a schematic diagram of effect of the cooperative scheduling method according to an embodiment of the disclosure.

FIG. 11 is a schematic diagram of effect of the cooperative scheduling method according to an embodiment of the disclosure.

Specifically, referring to FIG. 11 (where Cell is a cell), Cell 1 is a first type cell that requires cooperation, and Cell 2 is a second type cell with cooperative scheduling capability. After operation C31 is performed, Cell 2 may cooperate with Cell 1 to schedule traffics in a part of the beam coverage area. At this time, the beam coverage area pattern (also known as beam area pattern) 1 reduces a part of the beam coverage area requiring to be serviced, and beam coverage area pattern 2 adds a part of the beam coverage area requiring to be serviced.

Optionally, the beam coverage area serviced by each cell includes the following situations:

(1) the beam coverage area serviced by a cell remains unchanged;

(2) the number of beam coverage areas serviced by a cell is less than the number of beam coverage areas originally serviced by the cell;

(3) the number of beam coverage areas serviced by a cell is larger than the number of beam coverage areas originally serviced by the cell.

Wherein, the beam coverage area originally serviced by the cell refers to the beam coverage area that the cell needs to service when no cooperative scheduling is performed.

The following describes the specific process of determining the configuration information of the cell based on the beam coverage area to be serviced by the cell in this application in conjunction with the accompanying drawings and embodiments.

Wherein, the original beam coverage area, the originally scheduled beam coverage area, and the original serviced beam coverage area involved in the following embodiments refer to the beam coverage area managed by the cell before cooperative scheduling; the cooperative beam coverage area and the beam coverage area requiring cooperative scheduling refer to an increased or decreased beam coverage area when the cell performs cooperative scheduling.

Specifically, operation S5022 of determining the configuration information of the cell under the base station based on the information related to cooperative scheduling, includes the following operations D1 to D2:

Operation D1, for a cell of which the overlapped beam coverage area is required to be cooperatively scheduled by another cell, determining the information of the beam coverage area to be serviced by the cell as the configuration information of the cell.

Specifically, for a cell of which the number of beam coverage areas serviced by a cell is less than the number of beam coverage areas originally serviced by the cell, the configuration information of the currently processing traffic is not required to be changed.

Operation D2, for a cell that is required to perform cooperative scheduling on the overlapped beam coverage, determining the configuration information of the cell based on predicted resource utilization and/or predicted traffic delay corresponding to beam coverage area to be serviced by the cell.

Specifically, for a cell of which the number of beam coverage areas serviced by the cell is larger than the number of beam coverage areas originally serviced by the cell, in order to avoid to affect traffic processing in the beam coverage area originally serviced by the cell when cooperatively scheduling beam coverage areas of other cells, the disclosure re-configures the configuration information of the cell of which the overlapped beam coverage area is required to be cooperatively scheduled, based on the predicted resource utilization and/or the predicted traffic delay corresponding to a beam coverage area to be serviced by the cell.

Optionally, operation D2 includes at least one of the following operations D21-D23:

Operation D21, determining time-frequency resource of the cell based on predicted resource utilization corresponding to the originally scheduled beam coverage area and the beam coverage area requiring cooperative scheduling respectively.

Operation D22, determining time-frequency resource of the cell based on predicted traffic delays corresponding to the originally scheduled beam coverage area and the beam coverage area requiring cooperative scheduling respectively.

Operation D23, determining traffic requiring to be cooperatively scheduled by the cell, based on priorities and/or traffic delays of traffics in the beam coverage area requiring cooperative scheduling.

Specifically, in the embodiment of the disclosure, before re-configuring the configuration information of the cell of which the overlapped beam coverage area is required to be cooperatively scheduled, based on the predicted resource utilization and/or the predicted traffic delay corresponding to a beam coverage area to be serviced by the cell, cells are divided into levels, wherein cells with different levels correspond to different configuration information. Wherein, the predicted traffic delay can be determined by predicting the traffic delay.

Wherein, the cell level dividing can adopt the following operations E1-E2:

Operation E1, determining the level of resource utilization corresponding to the original beam coverage area of the cell under the base station based on the predicted resource utilization corresponding to the original beam coverage area of the cell under the base station.

FIG. 12 shows information on resource utilization corresponding to an original beam coverage area and a cooperative beam coverage area in cells under a base station according to an embodiment of the disclosure.

Optionally, referring to FIG. 12, the original beam coverage area P of the cell under the base station includes 1 to P, and each original beam coverage area corresponds to its own predicted PRB utilization (also known as predicted PRB utilization; PRB_L) $Y_1$~$Y_p$; in a unit of cells, the predicted PRB utilization (also known as the total predicted PRB utilization) corresponding to the cell under the base station is the sum of the predicted PRB utilization corresponding to respective beam coverage areas, i.e., Yo. Specifically, operation E1 includes the following operations E11-E13:

Operation E11, computing the sum of the predicted resource utilization corresponding to the original beam coverage area of the cell under the base station.

Operation E12, if the sum of the predicted resource utilization is higher than the fifth preset threshold, determining that the resource utilization level corresponding to the original beam coverage area of the cell under the base station is high. That is, Yo>Th5.

Operation E13, if the sum of the predicted resource utilization is lower than the fifth preset threshold, determining that the resource utilization level corresponding to the original beam coverage area of the cell under the base station is low. That is, Yo<=Th5.

Operation E2, determining length of traffic delay level corresponding to the original beam coverage area of the cell under the base station based on the predicted traffic delay (or predicted traffic volume delay) corresponding to the original beam coverage area of the cell under the base station.

FIG. 13 shows information on traffic delay corresponding to an original beam coverage area and a cooperative beam coverage area in cells under a base station according to an embodiment of the disclosure.

Optionally, referring to FIG. 13, the original beam coverage area P of the cell under the base station includes 1 to P, and each original beam coverage area corresponds to its own predicted traffic delay (also known as predicted service delay; Tracffic_L) $Z_1$~$Z_p$. In a unit of cells, the predicted traffic delay corresponding to the cell under the base station is the average value Zo of the predicted traffic delays corresponding to respective beam coverage areas. Specifically, operation E2 includes the following operations E21-E23:

Operation E21, computing the average value Zo of the predicted traffic delays corresponding to the original beam coverage area of the cell under the base station.

Operation E22, if the average value of the predicted traffic delays is higher than the sixth preset threshold, determining that the traffic delay level corresponding to the original beam coverage area of the cell under the base station is long. That is, Zo>Th6.

Operation E23, if the average value of the predicted traffic delays is lower than the sixth preset threshold, determining that the traffic delay level corresponding to the original beam coverage area of the cell under the base station is short. That is, Zo<=Th6.

Hereinafter, in combination with the cell level dividing situations shown in operations E1-E2, the specific process of allocating different configuration information to cells based on different level dividing results will be described below.

Specifically, when determining the configuration information of the cell, it is necessary to consider using redundant resources for assisting data transmission in the beam coverage area on the premise that the original cell service of the base station is not greatly affected.

Optionally, in conjunction with the content shown in FIGS. 12 and 13 (N/A (i.e. Not Applicable) in FIGS. 12 and 13 means that the column in the table is not applicable), the cooperative beam coverage area is explained: the current cooperative beam coverage area of the cell under the base station (also known as the cooperative beam area) Q includes P+1 to P+Q, wherein in a unit of cells, the predicted PRB utilization Yc corresponding to the cell under the base station is the sum of the predicted PRB utilization corresponding to respective cooperative beam coverage areas; the predicted traffic delay Zc corresponding to the cell under the base station is the average value of the predicted traffic delays corresponding to respective cooperative beam coverage areas.

FIG. 14 shows time-frequency resources, priorities and traffic configuration information corresponding to different levels according to an embodiment of the disclosure.

The following describes the configuration information of the cell under the base station with reference to FIG. 14, specifically, including at least one of operations F1-F4:

Operation F1, if the resource utilization level is low and the traffic delay level is short, configuring the cell under the base station to perform the scheduling of all traffics in the cooperative beam coverage area when performing cooperative scheduling.

Specifically, the first configuration information shown in FIG. 14, represents that when the resource utilization level of the cell under the base station is low and the traffic delay level is short, resources for scheduling traffics in the original beam coverage area of the cell are sufficient, and therefore, all resources can be used as shared cooperative resources to assist the cooperative beam coverage area for scheduling all services.

Operation F2: if the resource utilization level is high and the traffic delay level is short, configuring the time domain resources (also known as time resources) of the cell under the base station according to the ratio of the predicted resource utilization corresponding to the original beam coverage area and the cooperative beam coverage area respectively, and configuring the cell under the base station to perform the scheduling of the first traffic in the cooperative beam coverage area when performing cooperative scheduling, wherein the first traffic includes a traffic of which the priority is higher than the third set value and the traffic delay is higher than the fourth set value.

Specifically, as the second type of configuration information shown in FIG. 14, when the resource utilization level of the cell under the base station is high and the traffic delay level is short, the configuration of the information includes the following three types:

(1) time domain resource configuration: determining the corresponding time domain resource according to the ratio of the predicted resource utilization corresponding to the original beam coverage area of the cell under the base station and the predicted resource utilization corresponding to the cooperative beam coverage area of the cell under the base station. That is, the time domain resources of the original beam coverage area and the cooperative beam coverage area are divided based on Yo:Yc.

(2) priority configuration: in this application, a priority is set for the cooperative beam coverage area, and the priority may be a default value, or may be determined according to the beam weight. Optionally, it is set in operation D32 that a beam coverage area of which the priority is lower than the third set value is not allowed to be used as the cooperative beam coverage area, that is, the cell under the base station may not execute traffics in the cooperative beam coverage area of which the priority is lower than the third set value.

(3) traffic configuration: in the state corresponding to operation F2, a traffic with high delay requirement will not be allowed to be cooperatively scheduled by the cell under the base station, and therefore, the cell under the base station may not schedule a traffic with short delay in the cooperative beam coverage area. Wherein, the delay standard is determined by using the fourth set value, that is, the cell under the base station is configured to perform traffic scheduling with a delay higher than the fourth set value.

Operation F3: if the resource utilization level is low and the traffic delay level is long, configuring the frequency domain resources of the base station according to the ratio of the traffic delays corresponding to the original beam coverage area and the cooperative beam coverage area respectively, and configuring the cell under the base station to perform the scheduling of the second traffic in the cooperative beam coverage area when performing cooperative scheduling, wherein the second traffic includes a traffic of which the priority is higher than the fifth set value and the traffic delay is higher than the sixth set value.

Specifically, as the third type of configuration information shown in FIG. 14, when the resource utilization level of the cell under the base station is low and the traffic delay level is long, the configuration of the information includes the following three types:

(1) frequency domain resource configuration: determining the corresponding frequency domain resource according to the ratio of the predicted traffic delay corresponding to the original beam coverage area of the cell under the base station and the predicted traffic delay corresponding to the cooperative beam coverage area of the cell under the base station. That is, the frequency domain resources (also known as frequency resources) of the original beam coverage area and the cooperative beam coverage area are divided based on Zo:Zc.

(2) priority configuration: it is set that a beam coverage area of which the priority is lower than the fifth set value is not allowed to be used as the cooperative beam coverage area, that is, the cell under the base station may not execute traffic scheduling in the cooperative beam coverage area of which the priority is lower than the fifth set value.

(3) traffic configuration: in the state corresponding to operation F3, a traffic with high delay requirement will not be allowed to be cooperatively scheduled by the cell under the base station, and therefore, the cell under the base station may not schedule a traffic with short delay in the cooperative beam coverage area. Wherein, the delay standard is determined by using the sixth set value, that is, the cell under the base station is configured to perform traffic with a delay higher than the sixth set value.

Optionally, the third set value X1 and the fifth set value X1 may be the same, and the fourth set value and the sixth set value may be the same.

Operation F4: if the resource utilization level is high and the traffic delay level is long, configuring the time domain resources of the cell under the base station according to the ratio of the predicted resource utilization corresponding to the original beam coverage area and the cooperative beam coverage area respectively, configuring the frequency domain resources of the cell under the base station according to the ratio of the traffic delays corresponding to the original beam coverage area and the cooperative beam coverage area respectively, and configuring the cell under the base station to perform the scheduling of the third traffic in the cooperative beam coverage area when performing cooperative scheduling, wherein the third traffic includes a traffic of which the priority is higher than the seventh set value and the traffic delay is higher than the eighth set value.

Specifically, as the fourth type of configuration information shown in FIG. 14, when the resource utilization level of the cell under the base station is high and the traffic delay level is long, the configuration of the information includes the following four types:

(1) frequency domain resource configuration: determining the corresponding frequency domain resource according to the ratio of the predicted traffic delay corresponding to the original beam coverage area of the cell under the base station and the predicted traffic delay corresponding to the cooperative beam coverage area of the cell under the base station. That is, the frequency domain resources (also known as frequency-domain resources) of the original beam coverage area and the cooperative beam coverage area are divided based on Zo:Zc.

(2) time domain resource configuration: determining the corresponding time domain resource according to the ratio of the predicted resource utilization corresponding to the original beam coverage area of the cell under the base station and the predicted resource utilization corresponding to the cooperative beam coverage area of the cell under the base station. That is, the time domain resources of the original beam coverage area and the cooperative beam coverage area are divided based on Yo:Yc.

(3) priority configuration: it is set that a beam coverage area of which the priority is lower than the seventh set value is not allowed to be used as the cooperative beam coverage area, that is, the cell under the base station may not execute traffic scheduling in the cooperative beam coverage area of which the priority is lower than the seventh set value X2.

(4) traffic configuration: in the state corresponding to operation F4, a traffic with high delay requirement will not be allowed to be cooperatively scheduled by the cell under the base station, and therefore, the cell under the base station may not schedule a traffic with short delay in the cooperative beam coverage area. Wherein, the delay standard is determined by using the eighth set value, that is, the cell under the base station is configured to perform traffic scheduling with a delay higher than the eighth set value (the traffic delay is short in the case that the delay requirement is high).

The specific process of the accuracy detection process of the configuration information in this application will be described below in conjunction with the drawings and embodiments. The accuracy check in this application is to detect whether the existing cooperative scheduling scheme (existing configuration information) needs to be updated when the updated information related to cooperative scheduling is obtained. The following provides an accuracy detection scheme based on a cooperative scheduling group as a background. Optionally, the accuracy detection scheme can also be applied to a scenario where detection is performed based on all cells of base stations currently managed by the server.

Figure 15:
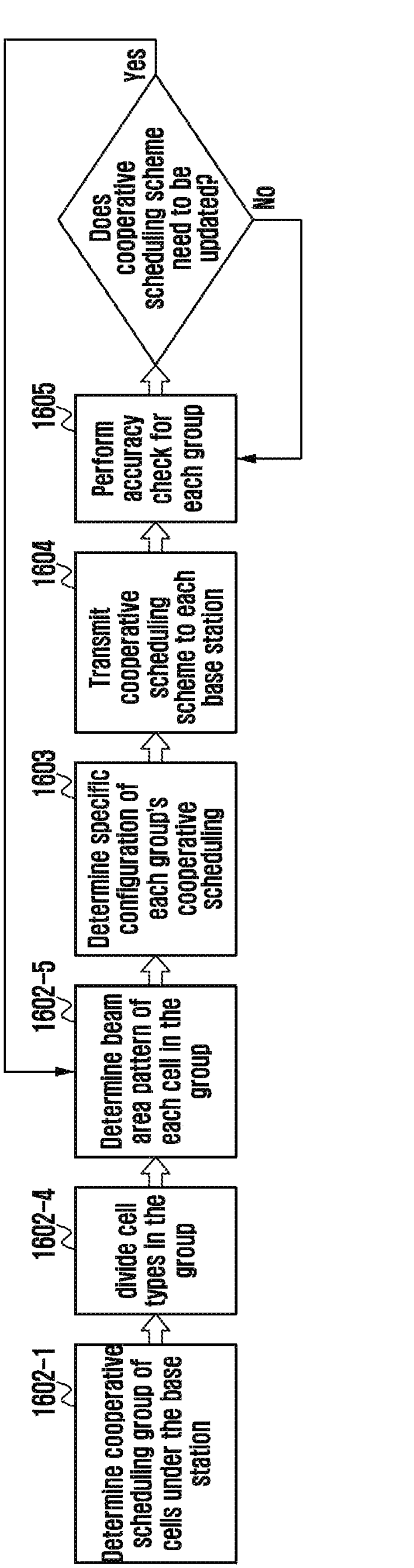
FIG. 15 is a schematic flowchart of the cooperative scheduling method according to an embodiment of the disclosure.

FIG. 15 is a schematic flowchart of the cooperative scheduling method according to an embodiment of the disclosure.

Figure 16:
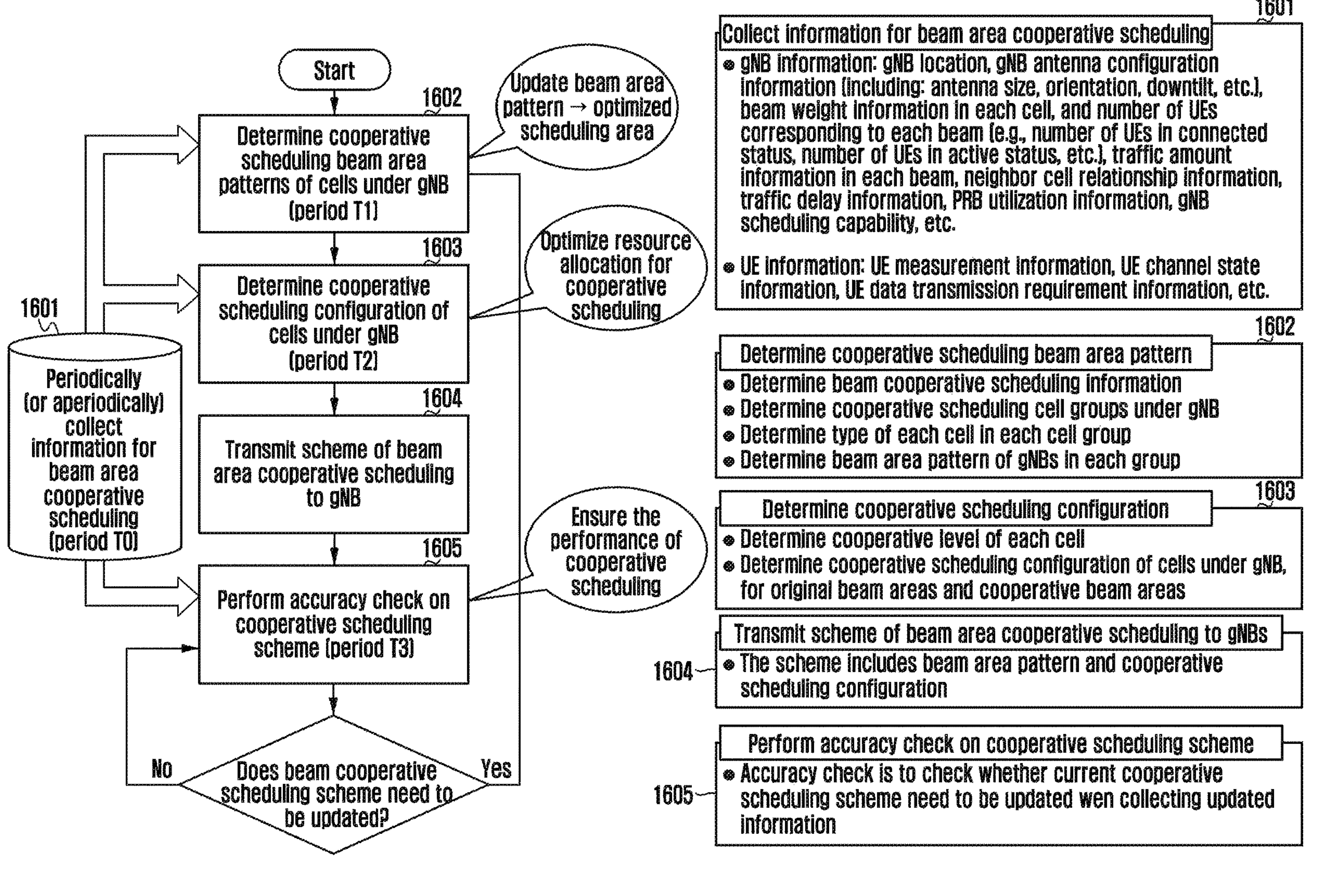
FIG. 16 is a schematic flowchart of the cooperative scheduling method in according to an embodiment of the disclosure.

Specifically, with reference to FIGS. 15 and 16, after operation S503 of configuring the base station based on the configuration information, the following operations S504-S505 are further included:

Operation S504, acquiring resource utilization and/or traffic delays corresponding to cells in the cooperative scheduling group.

Optionally, operation S504 may be that in operation S501, when obtaining information related to cooperative scheduling corresponding to the base station, related information for accuracy detection is screened out from the information related to cooperative scheduling, e.g., resource utilization information and/or traffic delay information. On this basis, the time node for obtaining information in operation S504 can refer to the content shown in operation S501 above.

In one possible embodiment, after the configuration information is determined in operation S502, operation S504 will be executed periodically or event-triggered.

Operation S505, updating the configuration information based on the resource utilization and/or the traffic delays corresponding to cells in the cooperative scheduling group.

Specifically, operation S505 includes the following operations S5051-S5053:

Operation S5051, detecting whether the resource utilization and the traffic delay corresponding to the cell under the base station in the cooperative scheduling group meet preset conditions.

Optionally, operation S5051 is at the end of the overall process of this application, as shown in FIGS. 15 and 16, after the cooperative scheduling scheme is issued to each base station in operation 1604, the server will start operation 1605 to check the accuracy of the cooperative scheduling scheme. Wherein, the accuracy check includes checking the resource utilization and/or traffic delay corresponding to the cell under the base station.

Specifically, operation S5051 includes the following operations a-b:

Operation a, for each cooperative scheduling group, detecting the resource utilization and the traffic delay of each cell under the base station in the cooperative scheduling group. When the number of overloaded cells under the base station in the cooperative scheduling group is greater than the ninth preset threshold, the recording number of cooperative scheduling groups is added to the preset value; the overloaded cells under the base station include the cell of which the resource utilization greater than the seventh preset threshold or the cell of which the traffic delay is greater than the eighth preset threshold.

Wherein, the trigger condition for the check may be a periodic function setting, or may be based on the occurrence of a set event, for example, the existing configuration information has been used for more than a preset time (for example, 10 h).

Specifically, assuming that the currently detected cooperative scheduling group includes 5 cells, the implementation of operation E11 can obtain the resource utilization and traffic delays corresponding to the 5 cells respectively. Specifically, the resource utilization corresponding to the cell under the base station is the sum of resource utilization corresponding to all beam coverage areas of the cell under the base station, and the traffic delay corresponding to the cell under the base station is the average traffic delay corresponding to all beam coverage areas of the cell under the base station.

Specifically, when judging whether the cell under the base station is overloaded, it can be judged by resource utilization or traffic delay. For example, in a unit of cells, when the resource utilization of the cell under the base station is greater than the seventh preset threshold (for example, 70%), it is determined that the load of the cell under the base station is too heavy; or, in units of cells, when the traffic delay corresponding to the cell of the base station is greater than the eighth preset threshold (for example, 200 ms), it is determined that the load of the cell under the base station is too heavy. When it is determined that the cell under the base station is overloaded, the number of cells under the base station that are overloaded is accumulated to a preset value (for example, the number of cells under the base station that are overloaded is accumulated by 1). When all cells in the cooperative scheduling group are detected and the number of cells under the base station that are currently overloaded is greater than the ninth preset threshold (for example, 3), the recording number of cooperative scheduling groups is added to a preset value (for example, 1, that is, the recording number of cooperative scheduling groups is accumulated by 1); otherwise, the corresponding recording number of cooperative scheduling groups is set to zero.

Operation b: determining that the preset condition is satisfied, when the recording number of cooperative scheduling groups is greater than the tenth preset threshold.

Optionally, assuming that all cells under the base station currently managed by the server are divided into 7 cooperative scheduling groups, if after operation E11 is performed, when the recording number of cooperative scheduling groups is greater than the tenth preset threshold (for example, 5), it is determined that the preset condition is satisfied.

Operation S5052: updating, if the preset condition is satisfied, the configuration information based on the currently acquired information related to cooperative scheduling in the base station.

FIG. 16 is a schematic flowchart of the cooperative scheduling method in according to an embodiment of the disclosure.

Specifically, when it is determined that the preset condition is satisfied, the cooperative scheduling scheme is triggered to be updated, and as shown in FIG. 16, the configuration information is updated based on the information related to cooperative scheduling acquired at the current moment.

Operation S5053: if the preset condition is not satisfied, there is no need to update the configuration information.

Figure 17:
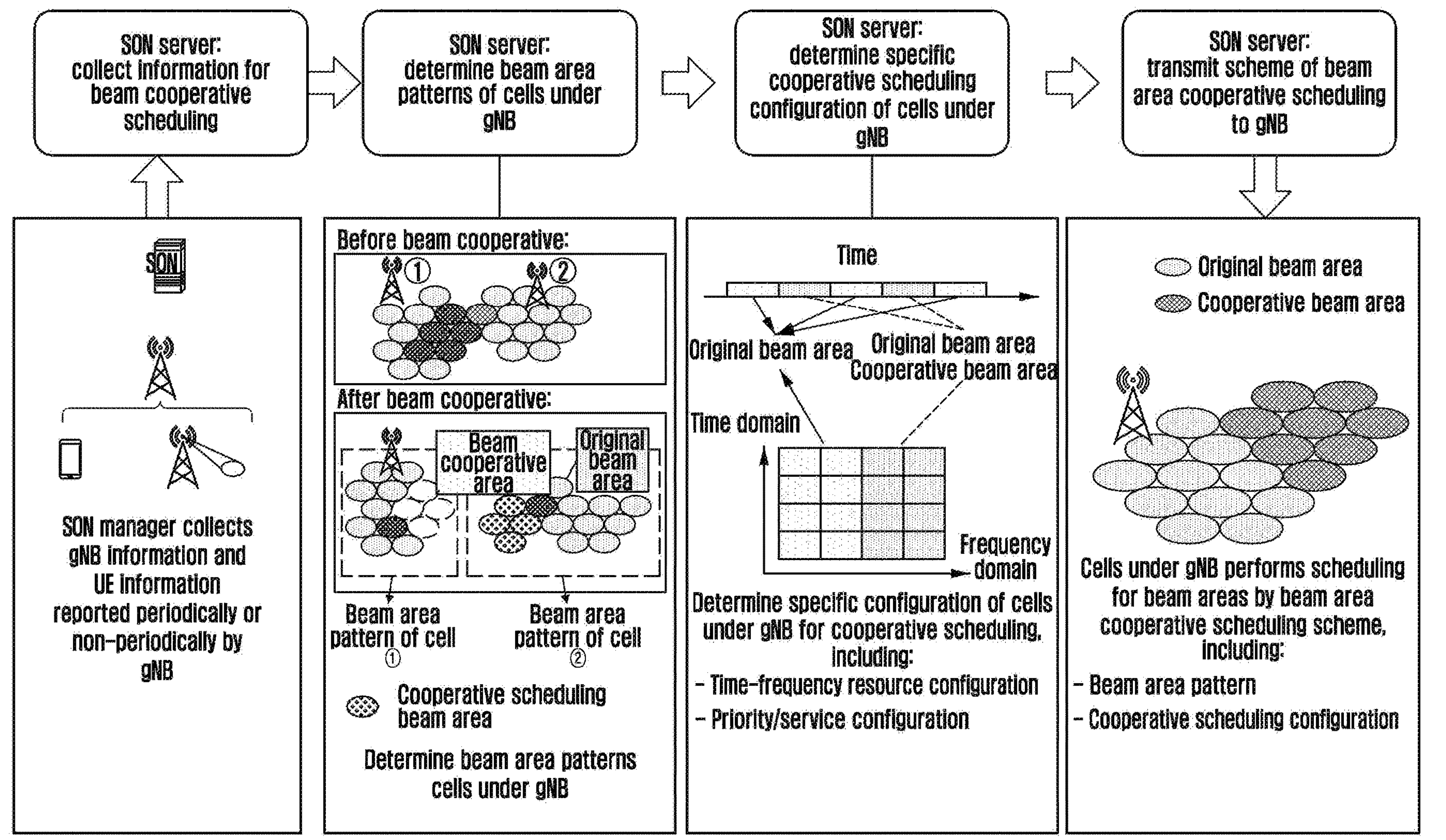
FIG. 17 is a schematic flowchart of the cooperative scheduling method according to an embodiment of the disclosure.

FIG. 17 is a schematic flowchart of the cooperative scheduling method according to an embodiment of the disclosure.

Figure 18:
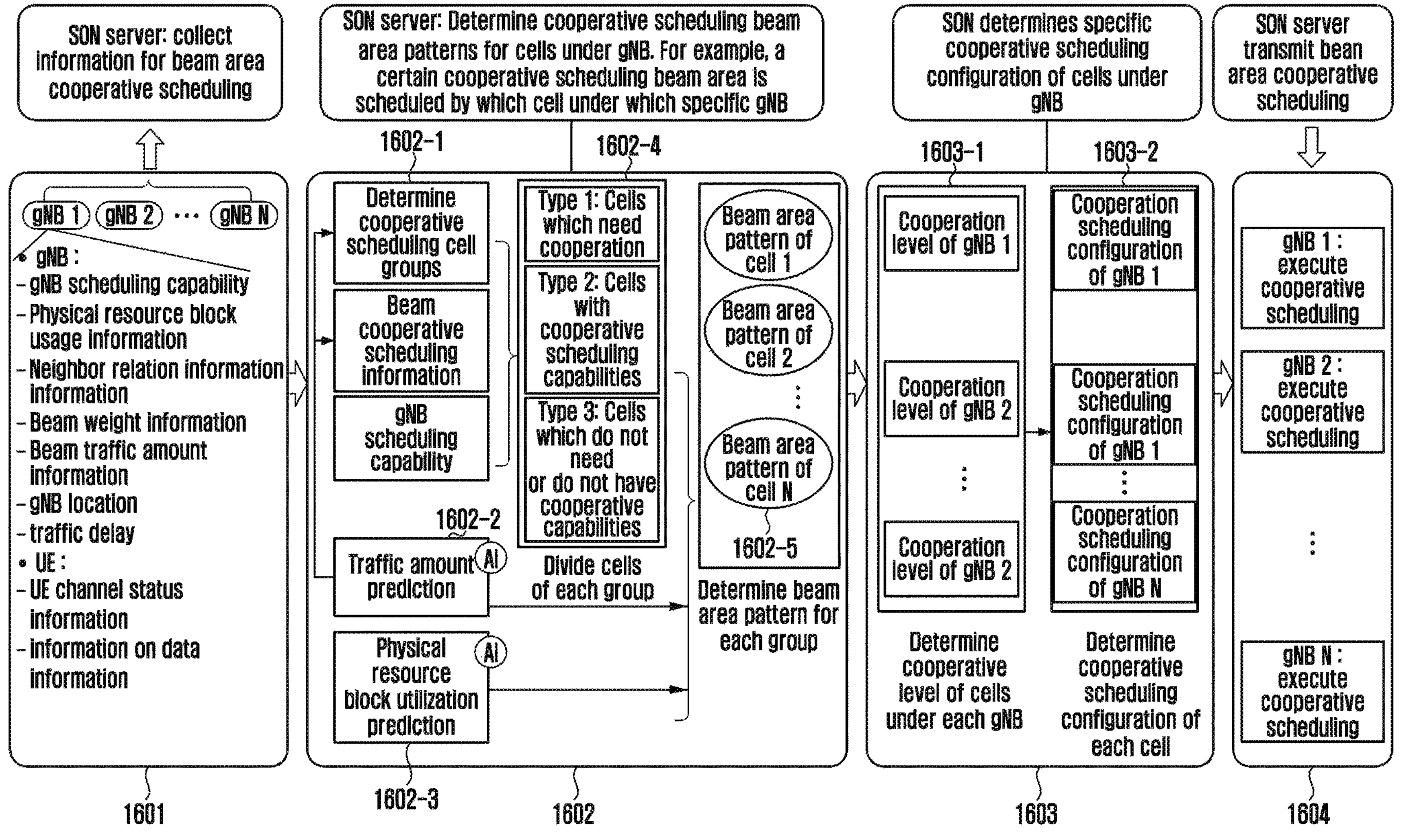
FIG. 18 is a schematic flowchart of the cooperative scheduling method according to an embodiment of the disclosure.

FIG. 18 is a schematic flowchart of the cooperative scheduling method according to an embodiment of the disclosure.

The following provides an overall overview of the cooperative scheduling method provided by the disclosure with reference to FIGS. 15 to 18.

In the cooperative scheduling method provided by the disclosure, referring to FIGS. 17 and 18, the cooperative scheduling method provided by the embodiments of the disclosure may include 4 operations:

Operation 1601: SON server collects information for beam area cooperative scheduling.

Operation 1602: SON server determines cooperative scheduling beam area patterns for cells. For example, which certain cell a certain cooperative scheduling beam area is scheduled by.

Operation 1603: SON server determines specific configuration information for the cell.

Operation 1604: SON server transmits bean area cooperative scheduling scheme to gNB.

Wherein, operation 1602 includes the following operations 1602-1 to 1602-5:

Operation 1602-1: determining cooperative scheduling groups.

Operation 1602-2: predicting traffic volume.

Operation 1602-3: predicting physical resource block utilization.

Operation 1602-4: dividing cells of each group.

Operation 1602-5: determining beam area pattern for each group.

Wherein, operation 1603 includes the following operations 1603-1 to 1603-2:

Operation 1603-1: determining cooperative level of each cell.

Operation 1603-2: determining cooperative scheduling configuration information (configuration information) of each cell.

In the cooperative scheduling method provided by this application, as shown in FIG. 16, on the basis of including operations 1601 to 16044 shown in the foregoing embodiments, an embodiment of this application further includes operation 1605: determining whether the cooperative scheduling scheme needs to be updated; if yes, returning to operation 1602, and if not, continuing to performing operation 1605.

In the cooperative scheduling method provided by the disclosure, as shown in FIG. 15, on the basis of including operations 1602-1, 1602-4, 1602-5, 1603, and 1604 shown in the foregoing embodiments, an embodiment of this application further includes operation 1605: determining whether the cooperative scheduling scheme needs to be updated; if yes, returning to operation 1602-5, and if not, continuing to performing operation 1605.

The following describes the specific process of the cooperative scheduling scheme applied to the base station provided by the disclosure in conjunction with the accompanying drawings and embodiments.

Considering that the same base station may correspond to one cell or multiple cells, the specific process of performing cooperative scheduling tasks provided below may be applicable to scenarios where one base station corresponds to one cell and where one base station corresponds to multiple cells.

Figure 19:
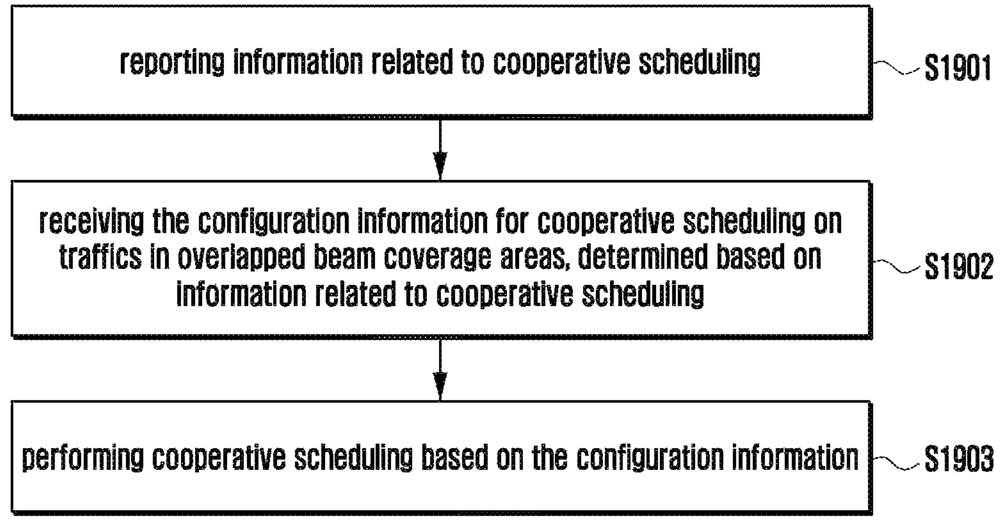
FIG. 19 is a schematic flowchart of the cooperative scheduling method according to an embodiment of the disclosure.

FIG. 19 is a schematic flowchart of the cooperative scheduling method according to an embodiment of the disclosure.

Specifically, with reference to FIG. 19, the cooperative scheduling method includes the following operations S1901 to S1903:

Operation S1901: reporting information related to cooperative scheduling.

Operation S1902: receiving the configuration information for cooperative scheduling on traffics in overlapped beam coverage areas, determined based on the information related to cooperative scheduling.

Operation S1903: performing cooperative scheduling based on the configuration information.

Wherein, in the embodiments of the disclosure, the specific process of the base station performing cooperative scheduling tasks based on the configuration information is mainly explained. For content related to determining the configuration information, it may be referred to the embodiments corresponding to the above operations S501-S503, which will not be repeated herein.

Specifically, the configuration information includes the beam coverage area pattern information and configuration information of the cell under the base station; operation S1903 of performing cooperative scheduling based on the configuration information, includes the following operations G1-G3:

Operation G1: determining a scheduling type of a cell based on the configuration information.

Optionally, when performing operation G1, for each cell, the following steps G11-G13 of determining the scheduling type are performed:

Operation G11: if the number of beam coverage areas currently to be scheduled is less than the number of original beam coverage areas, it is determined as the first scheduling type.

Figure 20:
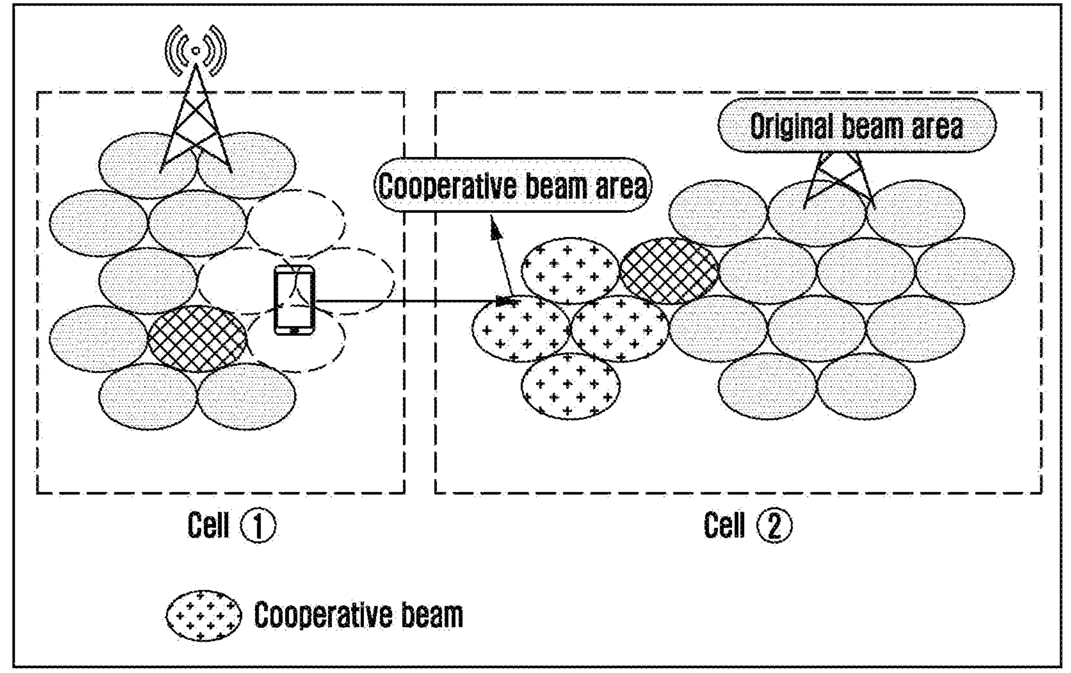
FIG. 20 is a schematic diagram of effect of the cooperative scheduling method according to an embodiment of the disclosure.

Referring to FIG. 20, as discussed below, the number of beam coverage area that currently need to be scheduled by Cell is less than the number of original beam coverage areas.

Operation G12: if the number of beam coverage areas that currently need to be scheduled is more than the number of original beam coverage areas, it is determined as the second scheduling type.

Referring to FIG. 20, as discussed below, the number of beam coverage area that currently need to be scheduled by Cell is more than the number of original beam coverage areas.

Operation G13: if the number of beam coverage areas currently to be scheduled is equal to the number of original beam coverage areas, it is determined as the third scheduling type.

Specifically, the number of beam coverage areas that currently need to be scheduled of the cell under the base station is not changed due to the received configuration information.

Wherein, when determining the scheduling type of a cell under a base station, a cell can correspond to one scheduling type; that is, when a base station corresponds to a cell, the base station corresponds to only one scheduling type; when a base station corresponds to multiple cells (assuming as three), there can be 1 to 3 scheduling types corresponding to the cell under the base station.

Operation G2: for a determined first type cell of which the overlapped beam coverage area is required to be cooperatively scheduled by another cell, handovering the UE(s), requiring to be cooperatively scheduled by the other cell, under the first type cell (belonging to first scheduling type) into a cell performing cooperative scheduling.

Referring to FIG. 20, discussed below, Cell① handover the UE in the cooperative beam coverage area (also known as the cooperative beam area) to the cell corresponding to Cell②. Cell① and Cell② can belong to the same gNB or different gNBs.

Operation G3: for a determined second type cell (the second scheduling type) that is required to perform cooperative scheduling on the overlapped beam coverage, configuring the second type cell to perform cooperative scheduling, based on the time domain resource, frequency domain resource and/or information on traffic to be executed in the configuration information.

FIG. 20 is a schematic diagram of effect of the cooperative scheduling method according to an embodiment of the disclosure.

Specifically, as shown in FIG. 20 below, the beam coverage area pattern information included in the configuration information can determine the beam coverage area (including the original beam coverage area and/or the cooperative beam coverage area) to be serviced by the cell under the base station.

Referring to FIG. 20, Cell② performs cooperative scheduling based on configuration information when scheduling beams. Specifically, the current configuration information of Cell② is updated according to the time domain resources, frequency domain resources, priority, and traffic configuration in the configuration information, and then the cell is configured to perform cooperative scheduling.

In the embodiment of this application, through the implementation of the above steps, for the cell of the first scheduling type, the relevant UE is notified to handovered to the cooperative scheduling cell in time to avoid traffic interruption; for the cell of the second scheduling type, the cooperative beam coverage area is scheduled under the conditions of specifying time domain resource, frequency domain resource, priority and traffic type, to ensure the traffic quality under the original beam coverage area.

In one possible embodiment, the aforementioned determined configuration information can be applied to not only cooperative beam scheduling between base stations, but also used for cooperative beam scheduling within base stations. When one base station corresponds to multiple cells, there may be overlapped coverage beam coverage areas between the cells. In this case, corresponding configuration information may be determined by combining information related to cooperative scheduling of respective cells, to configure the cells by the configuration information. Specifically, in the same base station, when there is an overlapped beam coverage area between cells A and B, for the overlapped coverage area, when the load of cell A is heavy, traffics in the overlapped beam coverage area originally responsible for cell A are handovered to cell B for scheduling. For example, in a certain base station, the current cell A manages 25 beam coverage areas and cell B manages 25 beam coverage areas, and the two can have overlapped coverage beam coverage areas. When the load of cell A is too heavy, the resource configuration is that cell A manages 20 beam coverage areas and cell B manages 30 beam coverage areas, so as to achieve cooperative beam scheduling, make full use of the beam scheduling capabilities of each cell, and reduce traffic delay.

To further illustrate the cooperative scheduling method provided by this application, the following is explained with reference to two application examples and experimental data.

Figure 21:
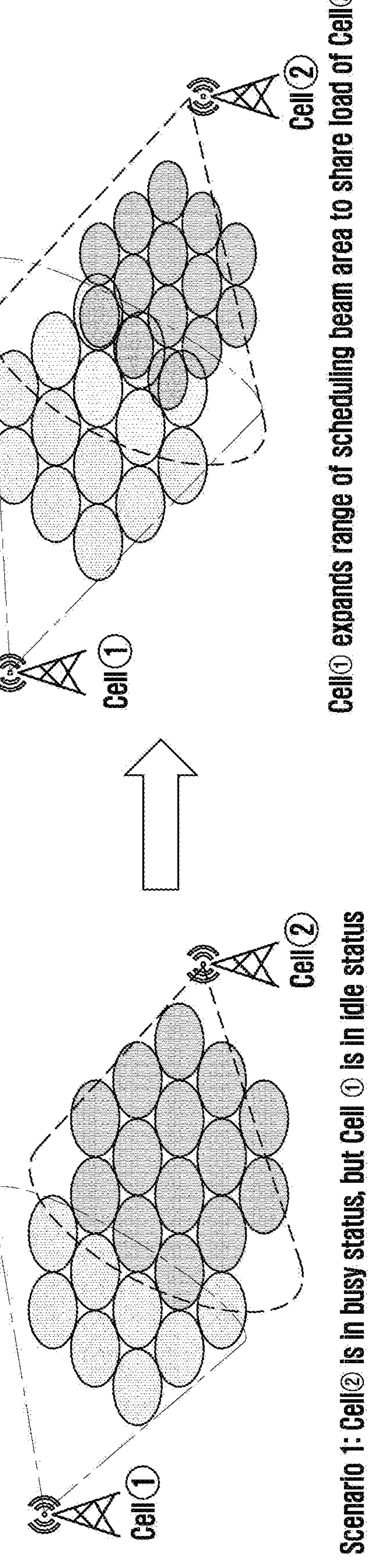
FIG. 21 is a schematic diagram of effect of the cooperative scheduling method according to an embodiment of the disclosure.

FIG. 21 is a schematic diagram of effect of the cooperative scheduling method according to an embodiment of the disclosure.

Application example 1: referring to the scenario shown in FIG. 21, Cell① mainly covers a wide street, and Cell② mainly covers a large concert hall. When a large-scale event is held in the concert hall, Cell② is extremely busy under the existing scheduling scheme, but Cell① is in an idle state. Therefore, the cooperative scheduling method proposed based on this application can expand the range of the beam area scheduled for Cell①, and share the pressure of Cell②, thereby adjusting the beam coverage area of the cells under the two base stations, and reducing the traffic delay of the cells under the high load base station.

FIG. 22 is a schematic diagram of effect of the cooperative scheduling method according to an embodiment of the disclosure.

Application example 2: referring to the scenario shown in FIG. 22, Cell① mainly covers a residential area, and Cell② mainly covers a business district; the existing scheduling scheme will cause Cell① in the residential area to be idle during the day, but Cell② located in the business district is busy, but the opposite would occur at night. In this case, the cooperative scheduling method proposed in this application can flexibly adjust the beam coverage area pattern of the cell under the base station according to the flow of people, so that Cell① and Cell② can coordinate the beam coverage area according to the traffic status during the day and night, and flexibly share the traffic pressure of residential and business districts.

Figure 23:
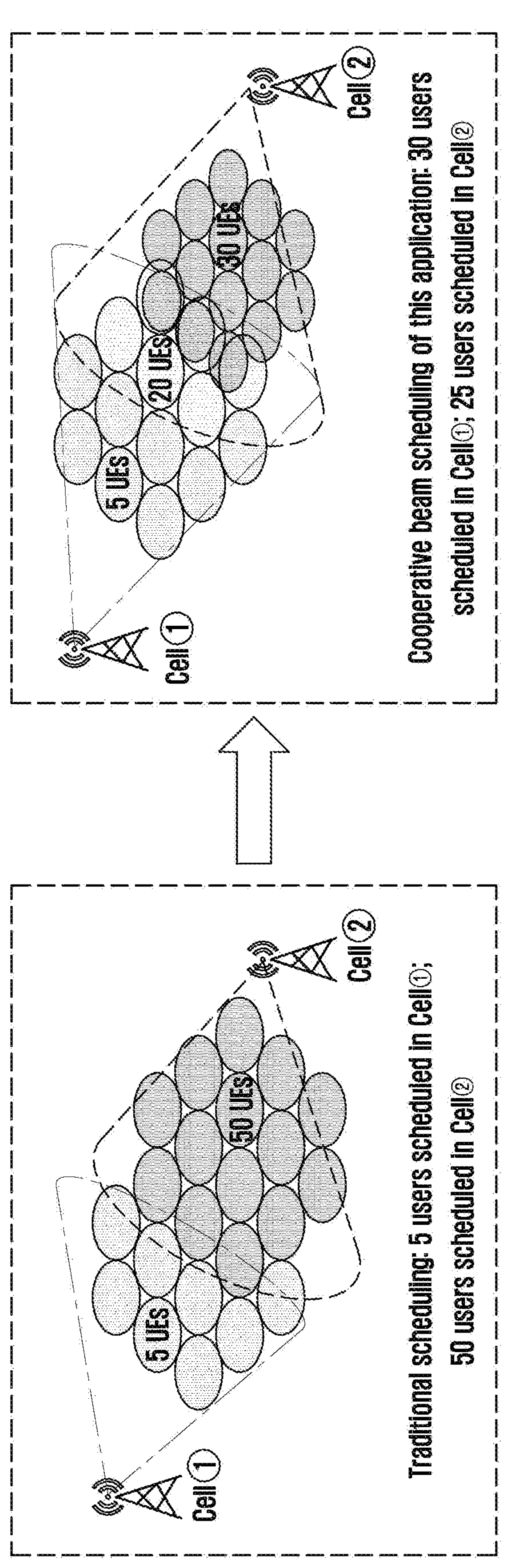
FIG. 23 is a schematic diagram of effect of the cooperative scheduling method according to an embodiment of the disclosure.

FIG. 23 is a schematic diagram of effect of the cooperative scheduling method according to an embodiment of the disclosure.

Figure 24:
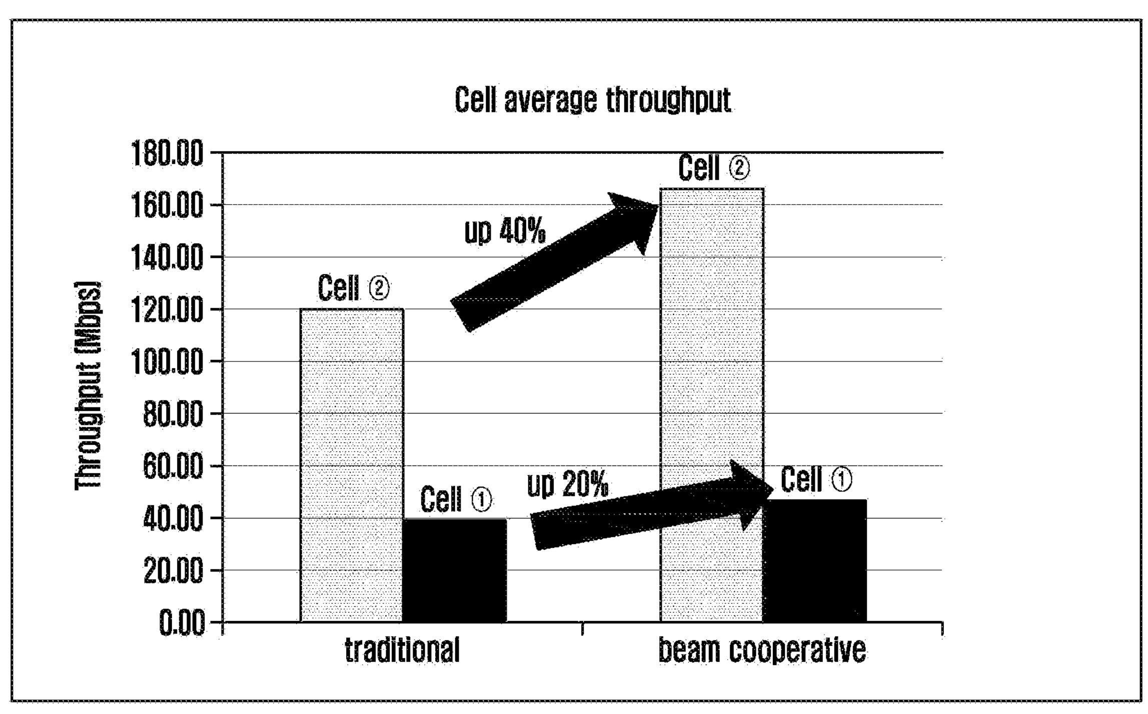
FIG. 24 is a schematic diagram of comparing average throughput of cells according to an embodiment of the disclosure.

FIG. 24 is a schematic diagram of comparing average throughput of cells according to an embodiment of the disclosure.

Figure 25:
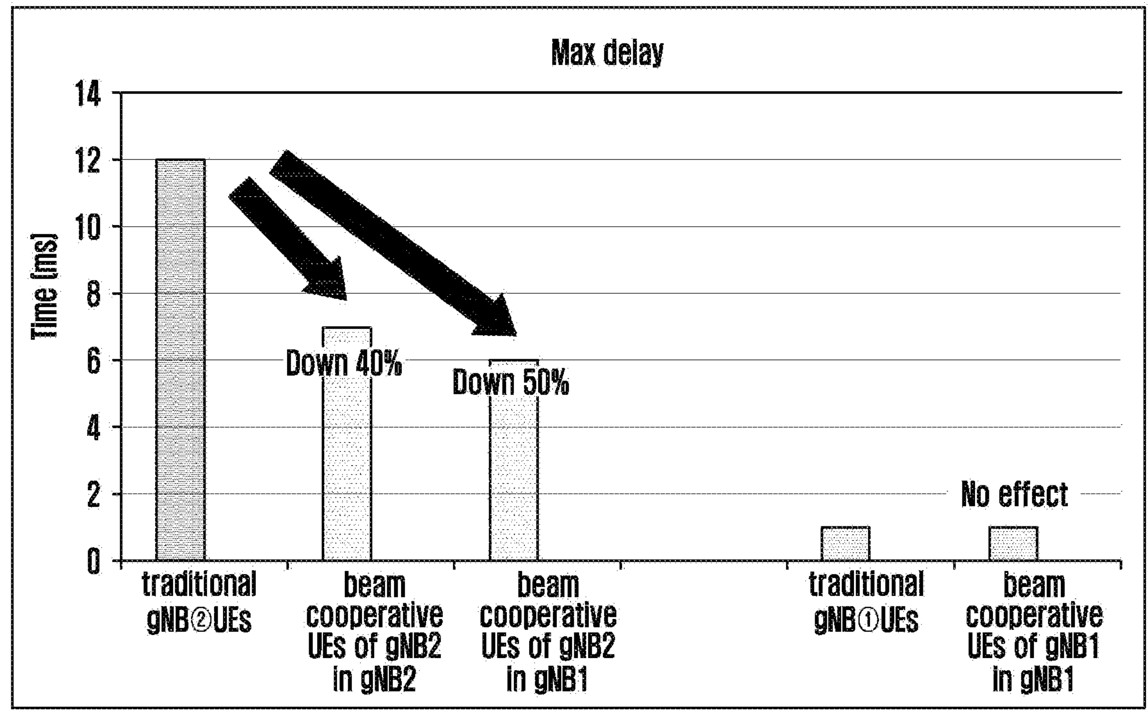
FIG. 25 is a schematic diagram of comparing the maximum delay according to an embodiment of the disclosure.

FIG. 25 is a schematic diagram of comparing the maximum delay according to an embodiment of the disclosure.

Experimental analysis: referring to the contents shown in FIGS. 23, 24, and 25, the case where a base station includes a cell is explained. In the existing scheduling scheme, Cell① schedules 5 users (5 UEs), and Cell schedules 50 users; the load of the cells under the two base stations is very unbalanced. Based on the implementation of the cooperative scheduling method of the disclosure, 20 users originally scheduled by Cell② in the overlapped area of two cells are handovered to be scheduled by Cell①, which greatly reduces the scheduling pressure of Cell②. In the scenario shown in FIG. 23, based on the implementation of the cooperative scheduling method of this application, the average throughput of the cell has been improved by 30% (Cell① increased by 20%, Cell② increased by 40%), and scheduling delay of Cell② has been reduced by 40%; the specific analysis is as follows:

(1) For Cell②, the reduction of edge users brings more scheduling opportunities to other users, thereby reducing the scheduling delay (also known as maximum delay), and increasing the throughput (up by 40%).

(2) For Cell①, since the original load is very light and the scheduling resources of newly added users are limited, it has no effect on the delay of the original users.

(3) For the newly added users of Cell①, due to more resources and scheduling opportunities than before, the scheduling delay is significantly reduced, and the throughput is significantly improved (up by 20%).

Figure 26:
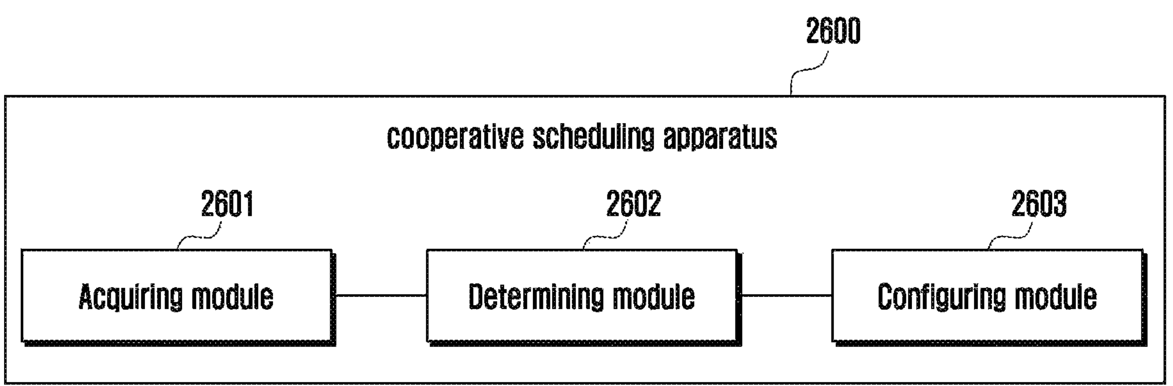
FIG. 26 is a schematic structural diagram of a cooperative scheduling apparatus provided according to an embodiment of the disclosure.

FIG. 26 is a schematic structural diagram of a cooperative scheduling apparatus provided according to an embodiment of the disclosure.

With reference to FIG. 26, a cooperative scheduling apparatus 2600 is provided below, which includes an acquiring module 2601, a determining module 2602, and a configuring module 2603; wherein, the acquiring module 2601 is configured to acquire information related to cooperative scheduling corresponding to a base station;

the determining module 2602 is configured to determine configuration information for cooperative scheduling on traffics in overlapped beam coverage areas, based on the information related to cooperative scheduling; and the configuring module 2603 is configured to configure the base station based on the configuration information.

Optionally, the information related to cooperative scheduling includes at least one of base station status information and UE status information of a UE serviced by the base station; wherein, the base station status information includes at least one of base station location information, base station antenna configuration information, beam weight information corresponding to a cell under the base station, information about the number of Ues corresponding to beams in the cell under the base station, beam traffic information, information on mapping relationship of beams and the cell under the base station, information on the number of Ues corresponding to the cell under the base station, cell traffic information, information on neighbor relationship corresponding to the cell under the base station, traffic delay information corresponding to the cell under the base station, resource utilization information corresponding to the cell under the base station, and scheduling capability information of the base station; and wherein, the UE status information includes at least one of UE channel status information, UE data transmission requirement information, and UE measurement information.

Optionally, the determining module 2602 includes:

a first determining unit configured to determine the beam coverage area to be serviced by the cell under the base station based on the information related to cooperative scheduling; and a second determining unit configured to determine the configuration information of the cell based on the beam coverage area to be serviced by the cell.

Optionally, the first unit being configured to determine the beam coverage area to be serviced by the cell under the base station based on the information related to cooperative scheduling, includes:

determining scheduling status information of the cell under the base station based on the information related to cooperative scheduling;

determining cell type based on the scheduling status information, wherein the type includes one of a first type which needs cooperation, a second type with cooperative scheduling capability, and a third type which does not need cooperation or has no cooperative capability; and determining the beam coverage area to be serviced by the cell based on the cell type.

Optionally, the scheduling status information of the cell includes predicted resource utilization and/or the number of active beams.

Optionally, the information related to cooperative scheduling includes predicted resource utilization and/or number of active beams; or the first determining unit being configured to determine scheduling status information of the cell under the base station based on the information related to cooperative scheduling, includes:

predicting the resource utilization and/or the number of active beams of the cell based on the information related to cooperative scheduling.

Optionally, the first determining unit being configured to determine cell type based on the scheduling status information includes at least one of the following:

determining the cell type as the first type, when the predicted number of active beams is greater than a first preset threshold, or the predicted resource utilization is greater than a second preset threshold;

determining the cell type as the second type, when the predicted number of active beams is less than a third preset threshold, and the predicted resource utilization is less than a fourth preset threshold; and determining the cell type as the third type for a cell that cannot be determined as the first type or the second type;

wherein, the first preset threshold is not less than the third preset threshold, and the second preset threshold is not less than the fourth preset threshold.

Optionally, the first determining unit being configured to determine the beam coverage area to be serviced by the cell based on the cell type, includes:

determining a cell providing service to the overlapped beam coverage area, based on the cell type; and determining a beam coverage area serviced by each cell, based on the cell providing service to the overlapped beam coverage area.

Optionally, the first determining unit being configured to determine a cell providing service to the overlapped beam coverage area, based on the cell type, includes:

determining a beam coverage area which needs cooperative scheduling, based on a beam coverage area overlapped by a cell belonging to the first type and another cell;

determining a candidate serving cell corresponding to the beam coverage area which needs cooperative scheduling, based on the beam coverage area which needs cooperative scheduling and types of respective cells; and determining a cell providing service to the beam coverage area which needs cooperative scheduling, based on the candidate serving cell.

Optionally, the first determining unit being configured to determine a cell providing service to the beam coverage area which needs cooperative scheduling, based on the candidate serving cell, includes:

performing the following steps until allocation of all beam coverage areas which need cooperative scheduling is completed:

selecting a corresponding beam coverage area with the largest predicted resource utilization among beam coverage areas which need cooperative scheduling;

and selecting a corresponding candidate serving cell with the lowest resource utilization among candidate serving cells corresponding to the selected beam coverage area, as a cell providing service to the selected beam coverage area.

Optionally, the first determining unit, before being configured to determine scheduling status information of the cell under the base station based on the information related to cooperative scheduling, further includes: dividing respective cells into different cooperative scheduling groups.

Optionally, the first determining unit being configured to determine scheduling status information of the cell under the base station based on the information related to cooperative scheduling includes:

determining scheduling status information of respective cells in a cooperative scheduling group, for each cooperative scheduling group, based on the information related to cooperative scheduling.

Optionally, the first determining unit being configured to divide respective cells into different cooperative scheduling groups includes:

determining a cooperative weight between cells based on predicted traffic volume in the beam coverage area overlapped between the cells; and dividing respective cells into different cooperative scheduling groups, based on the cooperative weight between cells.

Optionally, the first determining unit being configured to divide respective cells into different cooperative scheduling groups, based on the cooperative weight between cells includes at least one of the following:

dividing cells with the high cooperative weight into a same cooperative scheduling group; and repeating the following operations, until the number of cells in the cooperative scheduling group reaches to a first set value: including cells having the highest cooperative weight with existing cells in current cooperative scheduling group;

acquiring a cell relationship graph, wherein the cell relationship graph uses points to characterize cells, and edges to characterize cooperative weights between cells; judging, every after performing the following operation on cutting, whether an independent relationship graph in which the number of cells is less than a second set value is formed, and if yes, performing the following operation on cutting continually until all cells are divided into corresponding cooperative scheduling groups: cutting an edge with the lowest cooperative weight between cells, from the cell relationship graph.

Optionally, the first determining unit being configured to determine the configuration information of the cell based on the beam coverage area to be serviced by the cell, includes:

for a cell of which the overlapped beam coverage area is required to be cooperatively scheduled by another cell, determining information of the beam coverage area to be serviced by the cell as the configuration information of the cell; and for a cell that is required to perform cooperative scheduling on the overlapped beam coverage, determining the configuration information of the cell based on predicted resource utilization and/or predicted traffic delay corresponding to beam coverage area to be serviced by the cell.

Optionally, the beam coverage area to be serviced by the cell includes an originally scheduled beam coverage area and a beam coverage area requiring cooperative scheduling; and the second determining unit being configured to determine the configuration information on the cell performing cooperative scheduling based on predicted resource utilization and/or predicted traffic delay corresponding to beam coverage area to be serviced by the cell, includes at least one of the following:

determining time-frequency resource of the cell based on predicted resource utilization corresponding to the originally scheduled beam coverage area and the beam coverage area requiring cooperative scheduling respectively;

determining time-frequency resource of the cell based on predicted traffic delays corresponding to the originally scheduled beam coverage area and the beam coverage area requiring cooperative scheduling respectively; and determining traffic requiring to be cooperatively scheduled by the cell, based on priorities and/or traffic delays of traffics in the beam coverage area requiring cooperative scheduling.

Optionally, the apparatus 2600 further includes a detection module configured to acquire resource utilization and/or traffic delays corresponding to cells in the cooperative scheduling group and update the configuration information based on the resource utilization and/or the traffic delays corresponding to cells in the cooperative scheduling group.

Optionally, the configuring module 2603 being configured perform configuration on the base station based on the configuration information, includes:

transmitting the configuration information to the base station, so that the base station performs cooperative scheduling based on the configuration information.

Figure 27:
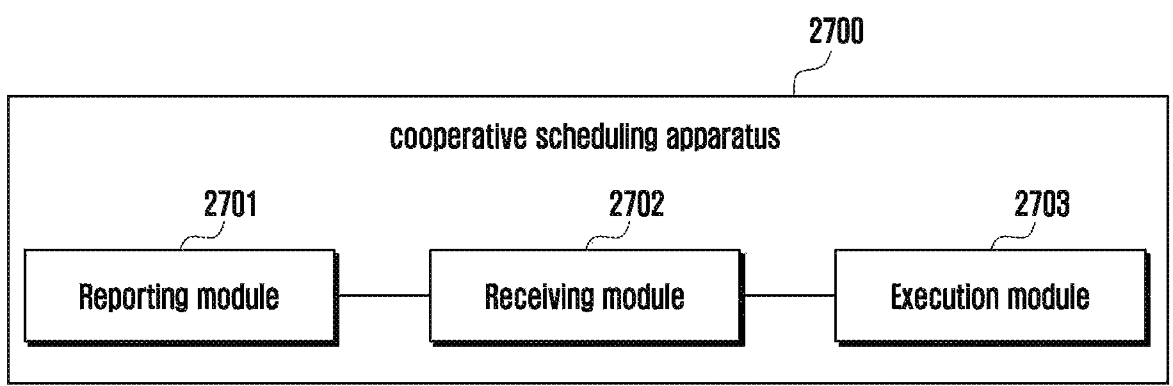
FIG. 27 is a schematic structural diagram of a cooperative scheduling apparatus provided according to an embodiment of the disclosure.

FIG. 27 is a schematic structural diagram of a cooperative scheduling apparatus provided according to an embodiment of the disclosure.

With reference to FIG. 27, a cooperative scheduling apparatus 2700 is provided below, which includes a reporting module 2701, a receiving module 2702, and an execution module 2703; wherein, the reporting module 2701 is configured to report information related to cooperative scheduling;

the receiving module 2702 is configured to receive configuration information for cooperative scheduling on traffics in overlapped beam coverage areas determined based on the information related to cooperative scheduling; and the execution module 2703 is configured to perform cooperative scheduling based on the configuration information.

Optionally, execution module 2703 being configured to perform cooperative scheduling based on the configuration information, includes:

determining a scheduling type of a cell based on the configuration information;

for a determined first type cell of which the overlapped beam coverage area is required to be cooperatively scheduled by another cell, handovering the UE(s), requiring to be cooperatively scheduled by the other cell, under the first type cell into a cell performing cooperative scheduling; and for a determined second type cell that is required to perform cooperative scheduling on the overlapped beam coverage, configuring the second type cell to perform cooperative scheduling, based on the time domain resource and/or frequency domain resource and/or traffic information to be executed in the configuration information.

The cooperative scheduling apparatus of this embodiment may perform a cooperative scheduling method provided by embodiments of the disclosure, and the implementation principles thereof are similar. It can be understood that the actions performed by the respective modules in the cooperative scheduling apparatus in the embodiments of the disclosure correspond to the steps in the cooperative scheduling method in the embodiments of the disclosure. Detailed description of the function of each module of the cooperative scheduling apparatus may refer to the corresponding description of the cooperative scheduling method shown in the foregoing, and details are not described herein again.

The above describes the cooperative scheduling apparatus provided by the embodiment of this application from the perspective of functional modularity. Next, an electronic device provided by the embodiment of this application will be introduced from the perspective of hardware materialization, and the computing system of the electronic device will be introduced at the same time.

Based on the same principle as the method shown in the embodiments of the disclosure, an electronic device is also provided in the embodiment of the disclosure. The electronic device may include, but is not limited to: a processor and a memory; the memory is configured to store a computer operation instruction; the processor is configured to execute the cooperative scheduling method shown in the embodiment by calling a computer operation instruction. Compared with the prior art, the implementation of the cooperative scheduling method in this application improves the throughput of the network and reduces the scheduling delay.

Figure 28:
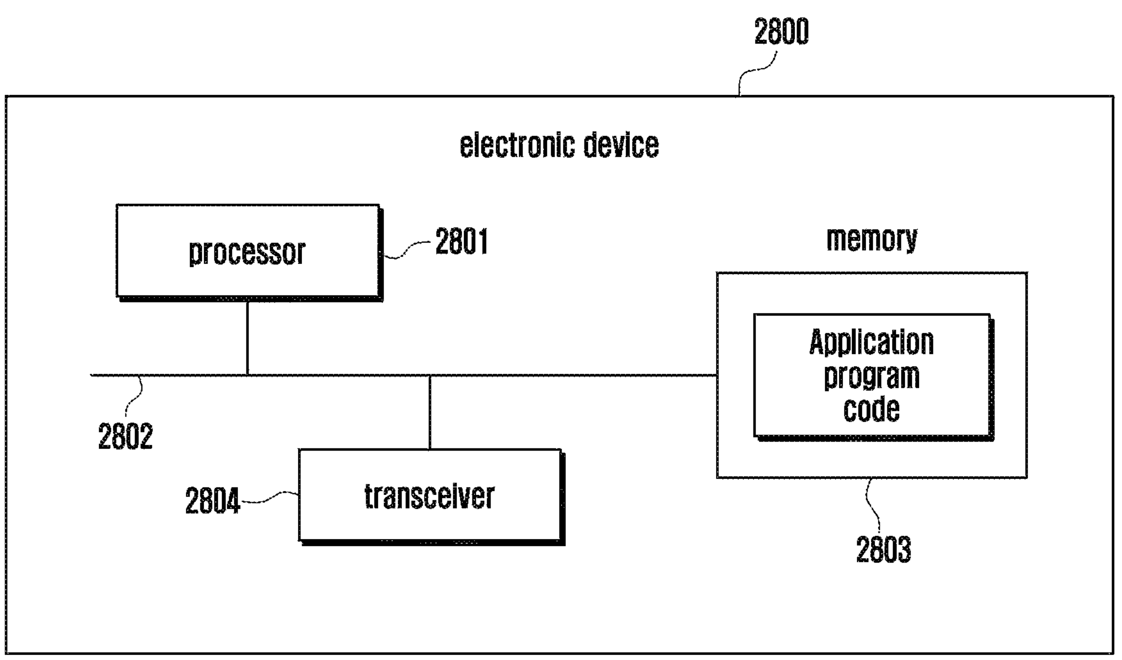
FIG. 28 is a schematic structural diagram of an electronic device provided according to an embodiment of the disclosure.

FIG. 28 is a schematic structural diagram of an electronic device provided according to an embodiment of the disclosure.

In an optional embodiment, an electronic device is provided. As shown in FIG. 28, the electronic device 2800 shown in FIG. 28 includes a processor 2801 and a memory 2803. The processor 2801 and the memory 2803 are connected, for example, via a bus 2802. Optionally, the electronic device 2800 may further include a transceiver 2804. It should be noted that the transceiver 2804 is not limited to one in actual application, and the structure of the electronic device 2800 is not limited to the embodiment of the disclosure.

The processor 2801 may be a Central Processing Unit (CPU), a general-purpose processor, a Digital Signal Processor (DSP), an Application Specific Integrated Circuit (ASIC), a Field Programmable Gated Array (FPGA) or other programmable logic devices, transistor logic devices, hardware components, or any combination thereof. Various logic blocks, modules, and circuits described in connection with the disclosure may be implemented or executed. The processor 2801 may also be a combination that implements computing functions, such as a combination that includes one or more microprocessors, a combination of DSP and microprocessors, etc.

The bus 2802 may include a path to transfer information between the above components. The bus 2802 may be a Peripheral Component Interconnect (PCI) bus or an Extended Industry Standard Architecture (EISA) bus or the like. The bus 2802 can be divided into an address bus, a data bus, a control bus, etc. For ease of representation, the bus is expressed by only one thick line in FIG. 28, but it does not mean only one bus or one type of bus.

The memory 2803 may be a Read Only Memory (ROM) or other types of static storage device that can store static information and instructions, a Random Access Memory (RAM) or other types of dynamic storage device that can store information and instructions. It can also be an Electrically Erasable Programmable Read Only Memory (EEPROM), a compact disc read only memory (CD-ROM) or other optical disc storage, disc storage (including compact disc, laser disc, optical disc, digital versatile disc, Blu-ray disc, etc.), magnetic disc storage medium or other magnetic storage device, or any other medium capable of carrying or storing desired program code in the form of instructions or data structures and capable of being accessed by a computer, but is not limited thereto.

The memory 2803 is configured to store application program codes for executing the solution of the disclosure, and the execution is controlled by the processor 2801. The processor 2801 is configured to execute the application program code stored in the memory 2803 to implement the contents shown in any of the foregoing method embodiments.

Wherein, electronic devices include but are not limited to, a mobile terminal (for example, a mobile phone, a notebook computer, a digital broadcast receiver, a PDA (personal digital assistant), a PAD (tablet computers), a PMP (portable multimedia player), a vehicle terminal (e.g., vehicle navigation terminals), etc.), and a fixed terminal (for example, a digital TV, a desktop computer, etc.).

Specifically, the aforementioned cooperative scheduling method can be executed by a SON server or other servers, or a base station or other access network or core network node. The electronic device shown in FIG. 28 can be a server, or a base station or other access networks or core network devices. The electronic device shown in FIG. 28 is only an example, and should not bring any limitation to the function and scope of use of the embodiments of the disclosure.

The embodiments of the disclosure provide a computer-readable storage medium with a computer program stored on the computer-readable storage medium that may, when executed on a computer, implement the corresponding content in the foregoing method embodiment. Compared with the prior art, the cooperative scheduling method in this application can meet service requirements in different durations, improve network throughput, and reduce scheduling delay.

It should be understood that although various steps in the flowchart of the drawings are shown in sequence as indicated by arrows, these steps are not necessarily executed in sequence as indicated by arrows. Unless explicitly stated herein, the execution of these steps is not strictly limited in sequence but may be performed in other sequences. Moreover, at least a part of the steps in the flowchart of the drawings may include a plurality of sub-steps or stages, which are not necessarily completed at the same time, but may be executed at different times, and the execution order thereof is not necessarily sequentially, but may be executed in turn or alternately with at least a part of the sub-steps or stages of other steps or other steps.

It should be noted that the above-mentioned computer-readable medium in the disclosure may be a computer-readable signal medium or a computer-readable storage medium or any combination of the two. The computer-readable storage medium may be, for example, but is not limited to, an electronic, magnetic, optical, electromagnetic, infrared, or semiconductor system, apparatus, or device, or any combination of the above. More specific examples of the computer-readable storage media may include, but are not limited to, electrical connections having one or more wires, portable computer disks, hard disks, random access memory (RAM), read only memory (ROM), erasable programmable read only memory (EPROM or flash memory), optical fiber, portable compact disk read only memory (CD-ROM), optical storage device, magnetic storage device, or any suitable combination of the above. In the disclosure, a computer-readable storage medium may be any tangible medium that may contain or store programs, which may be used by or in connection with an instruction execution system, apparatus, or device. In the disclosure, a computer-readable signal medium may include a data signal that is propagated in the baseband or propagated as part of a carrier, carrying computer-readable program codes. Such propagated data signals may take various forms, which includes, but is not limited to, electromagnetic signals, optical signals, or any suitable combination of the above. The computer-readable signal medium may also be any computer-readable medium except for a computer-readable storage medium, and the computer-readable signal medium may transmit, propagate or transport a program for use by or in connection with an instruction execution system, apparatus or device. Program codes contained on the computer-readable medium may be transmitted by any suitable medium, which includes but is not limited to: wire, fiber optic cable, RF (radio frequency), and the like, or any suitable combination of the above.

The above computer-readable medium may be contained in the above electronic device; or may be separately present and is not incorporated in the electronic device.

The computer-readable medium carries one or more programs, when the one or more programs are executed by the electronic device, causing the electronic device to execute the method shown in the foregoing embodiments.

Computer program codes for executing the operations of the disclosure may be written in one or more programming languages, or combinations thereof, wherein the programming languages includes an object-oriented programming language such as Java, Smalltalk, C++, and also includes conventional procedural programming language—such as "C" language or similar programming languages. The program codes may be executed entirely on the user's computer, partly executed on the user's computer, executed as an independent software package, partly executed on the user's computer and partly executed on the remote computer, or entirely executed on the remote computer or on the server. In the case of involving the remote computer, the remote computer may be connected to the user's computer through any kind of network, including a local area network (LAN) or a wide area network (WAN), or may be connected to an external computer (e.g., using an Internet service provider to connect via Internet).

The flowchart and block diagrams in the drawings illustrate the architecture, function, and operation of possible implementations of systems, methods, and computer program products according to various embodiments of the disclosure. In this regard, each block of the flowchart or block diagram may represent one module, a program segment, or a portion of the codes, and the module, the program segment, or the portion of codes includes one or more executable instructions for implementing the specified logic functions. It should also be noted that in some alternative implementations, the functions noted in the blocks may also occur in an order different from the order noted in the drawings. For example, two successively represented blocks may in fact be executed substantially in parallel, and they may sometimes be executed in the opposite order, depending upon the involved function. It is also noted that each block of the block diagrams and/or flowcharts, and combinations of blocks in the block diagrams and/or flowcharts, may be implemented in a dedicated hardware-based system that executes the specified functions or operations, or it may be implemented by a combination of dedicated hardware and computer instructions.

The modules involved in the embodiments described in the disclosure can be implemented in software or hardware. Wherein, a name of a module does not constitute a limitation on the module itself under certain circumstances. For example, the acquiring module can also be described as "a module for acquiring information related to cooperative scheduling corresponding to a base station".

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a network-side control node in a communication system, the method comprising:

obtaining, from a plurality of base stations, base station status information and user equipment (UE) status information;

determining scheduling status information of cells of the plurality of base stations based on the base station status information and the UE status information, wherein the scheduling status information indicates a predicted physical resource block (PRB) utilization and a predicted number of active beams for each of the cells;

determining cell types of the cells based on the scheduling status information, wherein a cell type is one of a first type requiring cooperative scheduling, a second type for performing the cooperative scheduling, or a third type excluded from the cooperative scheduling;

determining a cell to perform scheduling of traffic in a beam coverage area overlapped among the cells of the plurality of base stations, based on the cell types; and transmitting, to a base station of the cell, configuration information for the cooperative scheduling.

2. The method of claim 1, wherein the base station status information comprises at least one of base station location information, base station antenna configuration information, beam weight information corresponding to the cell under the base station, information about a number of UEs corresponding to beams in the cell, beam traffic information, information on mapping relationship of beams and the cell, information on a number of UEs corresponding to the cell, cell traffic information, information on neighbor relationship corresponding to the cell, traffic delay information corresponding to the cell, resource utilization information corresponding to the cell, or scheduling capability information, and wherein the UE status information comprises at least one of UE channel status information, UE data transmission requirement information, or UE measurement information.

3. The method of claim 1, further comprising:

determining beam coverage areas to be serviced by the cell based on the cell types; and determining the configuration information of the cell based on the beam coverage areas to be serviced by the cell.

4. The method of claim 3, wherein the cell type is determined as the first type in a case that a predicted number of active beams is greater than a first preset threshold or a predicted PRB utilization is greater than a second preset threshold, wherein the cell type is determined as the second type in a case that the predicted number of active beams is less than a third preset threshold and the predicted PRB utilization is less than a fourth preset threshold, wherein the cell type is determined as the third type in a case that the cell type cannot be determined as the first type or the second type, and wherein the first preset threshold is greater than or equal to the third preset threshold and the second preset threshold is greater than or equal to the fourth preset threshold.

5. The method of claim 3, wherein determining of the beam coverage areas comprises:

determining a plurality of beam coverage areas which need cooperative scheduling, based on the base station status information and the UE status information;

determining candidate serving cells corresponding to the plurality of beam coverage areas which need cooperative scheduling, based on the plurality of beam coverage areas which need cooperative scheduling and types of respective cells;

selecting the beam coverage area with a largest predicted PRB utilization among the plurality of beam coverage areas which need cooperative scheduling; and selecting a serving cell with a lowest resource utilization among the candidate serving cells corresponding to the selected beam coverage area, as the cell providing service to the selected beam coverage area.

6. The method of claim 3, further comprising:

determining a cooperative weight between cells based on predicted traffic volume in the beam coverage area overlapped between the cells;

dividing respective cells into different cooperative scheduling groups based on the cooperative weight between cells;

acquiring at least one of resource utilization or traffic delays corresponding to cells in a cooperative scheduling group; and updating the configuration information based on the at least one of the resource utilization or the traffic delays corresponding to cells in the cooperative scheduling group, wherein the scheduling status information comprises scheduling status information of respective cells in a cooperative scheduling group, for each cooperative scheduling group.

7. The method of claim 6, wherein dividing the respective cells into different cooperative scheduling groups comprises:

dividing cells with a high cooperative weight into a same cooperative scheduling group, repeating the following operations, until a number of cells in the cooperative scheduling group reaches to a first set value, and dividing a cell with the highest cooperative weight among existing cells in the cooperative scheduling group.

8. The method of claim 6, wherein dividing the respective cells into different cooperative scheduling groups comprises:

acquiring a cell relationship graph, wherein the cell relationship graph uses points to characterize cells, and edges to characterize cooperative weights between cells, identifying, every after performing the following operation on cutting, whether an independent relationship graph in which the number of cells is less than a second set value is formed, in case that the independent relationship graph is formed, dividing corresponding cells into a same cooperative scheduling group, and in case that the independent relationship graph is not formed, performing the following operation on cutting continually until all cells are divided into corresponding cooperative scheduling groups: cutting an edge with the lowest cooperative weight between cells, from the cell relationship graph.

9. The method of claim 3, wherein the beam coverage areas to be serviced by the cell comprise an originally scheduled beam coverage area and the beam coverage area requiring cooperative scheduling, wherein determining the configuration information of the cell comprises:

for a cell of which the overlapped beam coverage area is required to be cooperatively scheduled by another cell, determining information of the beam coverage area to be serviced by the cell as the configuration information of the cell; and for a cell that is required to perform cooperative scheduling on the overlapped beam coverage, determining the configuration information of the cell based on the predicted PRB utilization and/or predicted traffic delay corresponding to the beam coverage area to be serviced by the cell.

10. The method of claim 9, wherein the determining the configuration information of the cell comprises at least one of the following:

determining time-frequency resource of the cell based on the predicted PRB utilization corresponding to the originally scheduled beam coverage area and the beam coverage area requiring cooperative scheduling respectively;

determining time-frequency resource of the cell based on predicted traffic delays corresponding to the originally scheduled beam coverage area and the beam coverage area requiring cooperative scheduling respectively; and determining traffic requiring to be cooperatively scheduled by the cell, based on at least one of priorities or traffic delays of traffics in the beam coverage area requiring cooperative scheduling.

11. A network-side control node in a communication system, the network-side control node comprising:

a transceiver;

memory storing instructions; and at least one processor, wherein the instructions, when executed by the at least one processor, cause the network-side control node to:

obtain, from a plurality of base stations, base station status information and user equipment (UE) status information, determine scheduling status information of cells of the plurality of base stations based on the base station status information and the UE status information, wherein the scheduling status information indicates a predicted physical resource block (PRB) utilization and a predicted number of active beams for each of the cells, determine cell types of the cells based on the scheduling status information, wherein a cell type is one of a first type requiring cooperative scheduling, a second type for performing the cooperative scheduling, or a third type excluded from the cooperative scheduling, determine a cell to perform scheduling of traffic in a beam coverage area overlapped among the cells of the plurality of base stations, based on the cell types, and transmit, to a base station of the cell, configuration information for the cooperative scheduling.

12. The network-side control node of claim 11, wherein the base station status information comprises at least one of base station location information, base station antenna configuration information, beam weight information corresponding to the cell under the base station, information about a number of UEs corresponding to beams in the cell, beam traffic information, information on mapping relationship of beams and the cell, information on a number of UEs corresponding to the cell, cell traffic information, information on neighbor relationship corresponding to the cell, traffic delay information corresponding to the cell, resource utilization information corresponding to the cell, or scheduling capability information, and wherein the UE status information comprises at least one of UE channel status information, UE data transmission requirement information, or UE measurement information.

13. The network-side control node of claim 11, wherein the instructions, when executed by the at least one processor, further cause the network-side control node to:

determine beam coverage areas to be serviced by the cell based on the cell types, and determine the configuration information of the cell based on the beam coverage areas to be serviced by the cell.

14. The network-side control node of claim 13, wherein the cell type is determined as the first type in a case that a predicted number of active beams is greater than a first preset threshold or a predicted PRB utilization is greater than a second preset threshold, wherein the cell type is determined as the second type in a case that the predicted number of active beams is less than a third preset threshold and the predicted PRB utilization is less than a fourth preset threshold, wherein the cell type is determined as the third type in a case that the cell type cannot be determined as the first type or the second type, and wherein the first preset threshold is greater than or equal to the third preset threshold and the second preset threshold is greater than or equal to the fourth preset threshold.

15. The network-side control node of claim 13, wherein the instructions, when executed by the at least one processor, further cause the network-side control node to:

determine a plurality of beam coverage areas which need cooperative scheduling, based on the base station status information and the UE status information, determine candidate serving cells corresponding to the plurality of beam coverage areas which need cooperative scheduling, based on the plurality of beam coverage areas which need cooperative scheduling and types of respective cells, select the beam coverage area with a largest predicted PRB utilization among the plurality of beam coverage areas which need cooperative scheduling, and select a serving cell with a lowest resource utilization among the candidate serving cells corresponding to the selected beam coverage area, as the cell providing service to the selected beam coverage area.

16. The network-side control node of claim 13, wherein the instructions, when executed by the at least one processor, further cause the network-side control node to:

determine a cooperative weight between cells based on predicted traffic volume in the beam coverage area overlapped between the cells, divide respective cells into different cooperative scheduling groups based on the cooperative weight between cells, acquire at least one of resource utilization or traffic delays corresponding to cells in a cooperative scheduling group, and update the configuration information based on the at least one of the resource utilization or the traffic delays corresponding to cells in the cooperative scheduling group, and wherein the scheduling status information comprises scheduling status information of respective cells in a cooperative scheduling group, for each cooperative scheduling group.

17. The network-side control node of claim 16, wherein, to divide the respective cells into different cooperative scheduling groups, the instructions, when executed by the at least one processor, further cause the network-side control node to:

divide cells with a high cooperative weight into a same cooperative scheduling group, repeat the following operations, until a number of cells in the cooperative scheduling group reaches to a first set value, and divide a cell with the highest cooperative weight among existing cells in the cooperative scheduling group.

18. The network-side control node of claim 16, wherein, to divide the respective cells into different cooperative scheduling groups, the instructions, when executed by the at least one processor, further cause the network-side control node to:

acquire a cell relationship graph, wherein the cell relationship graph uses points to characterize cells, and edges to characterize cooperative weights between cells, identify, every after performing the following operation on cutting, whether an independent relationship graph in which the number of cells is less than a second set value is formed, in case that the independent relationship graph is formed, divide corresponding cells into a same cooperative scheduling group, and in case that the independent relationship graph is not formed, perform the following operation on cutting continually until all cells are divided into corresponding cooperative scheduling groups: cutting an edge with the lowest cooperative weight between cells, from the cell relationship graph.

19. The network-side control node of claim 13, wherein the beam coverage areas to be serviced by the cell comprise an originally scheduled beam coverage area and the beam coverage area requiring cooperative scheduling, and wherein, to determine the configuration information of the cell, the instructions, when executed by the at least one processor, further cause the network-side control node to:

for a cell of which the overlapped beam coverage area is required to be cooperatively scheduled by another cell, determine information of the beam coverage area to be serviced by the cell as the configuration information of the cell, and for a cell that is required to perform cooperative scheduling on the overlapped beam coverage, determine the configuration information of the cell based on a predicted PRB utilization and/or predicted traffic delay corresponding to the beam coverage area to be serviced by the cell.

20. The network-side control node of claim 19, wherein, to determine the configuration information of the cell, the instructions, when executed by the at least one processor, further cause the network-side control node to:

determine time-frequency resource of the cell based on a predicted PRB utilization corresponding to the originally scheduled beam coverage area and the beam coverage area requiring cooperative scheduling respectively, determine time-frequency resource of the cell based on predicted traffic delays corresponding to the originally scheduled beam coverage area and the beam coverage area requiring cooperative scheduling respectively, or determine traffic requiring to be cooperatively scheduled by the cell, based on at least one of priorities or traffic delays of traffics in the beam coverage area requiring cooperative scheduling.

* * * * *